US007307635B1

(12) United States Patent
Yang et al.

(10) Patent No.: US 7,307,635 B1
(45) Date of Patent: Dec. 11, 2007

(54) DISPLAY ROTATION USING A SMALL LINE BUFFER AND OPTIMIZED MEMORY ACCESS

(75) Inventors: Jimmy Yang, Saratoga, CA (US); Bo Ye, Cupertino, CA (US); Edward M. Jacobs, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 526 days.

(21) Appl. No.: 10/906,091

(22) Filed: Feb. 2, 2005

(51) Int. Cl.
*G09G 5/36* (2006.01)
*G09G 5/00* (2006.01)
*G06K 9/32* (2006.01)

(52) U.S. Cl. ...................... 345/560; 345/649; 345/658; 382/296; 382/297; 348/583

(58) Field of Classification Search ................ 345/649, 345/656, 657, 658, 560; 348/580, 583; 382/289, 382/296, 297
See application file for complete search history.

(56) References Cited

U.S. PATENT DOCUMENTS

| | | | | |
|---|---|---|---|---|
| 4,498,079 | A | 2/1985 | Ghosh et al. | 463/33 |
| 4,947,344 | A | 8/1990 | Hayashi et al. | 345/658 |
| 5,133,076 | A | 7/1992 | Hawkins et al. | 708/141 |
| 5,361,339 | A * | 11/1994 | Kadakia et al. | 711/211 |
| 5,966,116 | A * | 10/1999 | Wakeland | 345/658 |
| 6,226,016 | B1 | 5/2001 | Chee et al. | 345/572 |
| 6,330,374 | B1 * | 12/2001 | Yamaguchi et al. | 382/297 |
| 6,400,851 | B1 | 6/2002 | Shih | 382/297 |
| 6,781,587 | B2 | 8/2004 | Grigor | |
| 6,801,674 | B1 * | 10/2004 | Turney | 382/298 |
| 2002/0048410 | A1 | 4/2002 | So et al. | 382/248 |
| 2004/0166943 | A1 | 8/2004 | San et al. | 463/44 |
| 2004/0255175 | A1 | 12/2004 | Oteki et al. | 713/300 |
| 2005/0270300 | A1 * | 12/2005 | Yang et al. | 345/560 |
| 2006/0103679 | A1 * | 5/2006 | Kim et al. | 345/658 |

* cited by examiner

*Primary Examiner*—Xiao Wu
*Assistant Examiner*—David Lin
(74) *Attorney, Agent, or Firm*—g Patent LLC; Stuart T. Auvinen

(57) ABSTRACT

A frame buffer stores X pixels per line and Y lines and is read using a burst of B pixels. The un-rotated image is rotated by 90 degrees for display by writing and reading pixels from a line buffer. The line buffer stores a block of B*Y pixels. The frame buffer is logically divided into X/B blocks that are B pixels wide. Blocks are read from the frame buffer from the bottom line to the top with a burst of B pixels per line. An offset locate pixels to read in the line buffer. The offset is B for the first block, and increases by a factor of B for each block read, but wraps around modulo B*Y−1. Pixels for a next block are written into the line buffer to locations vacated as pixels are read out. The increasing offset re-orders the pixels for the rotated display order.

21 Claims, 20 Drawing Sheets

FIG. 1A FIG. 1B
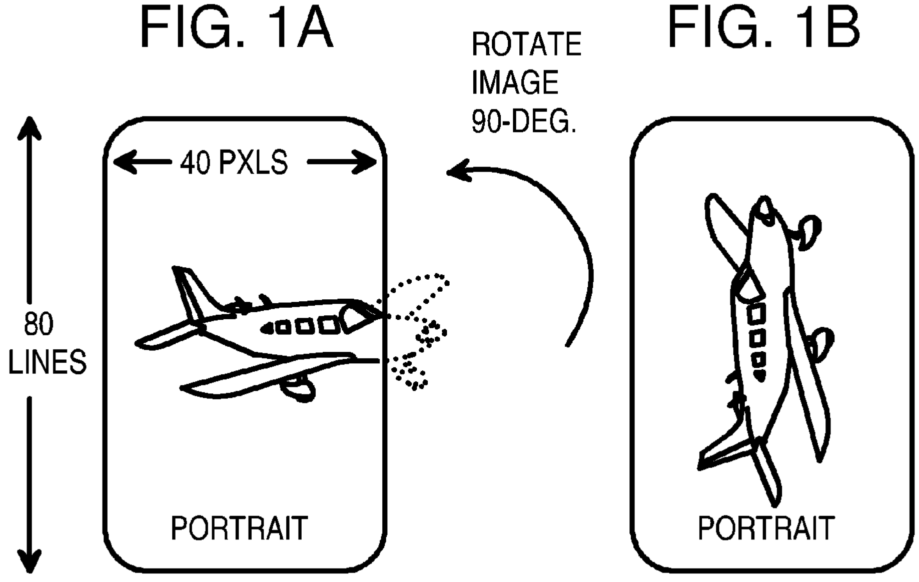
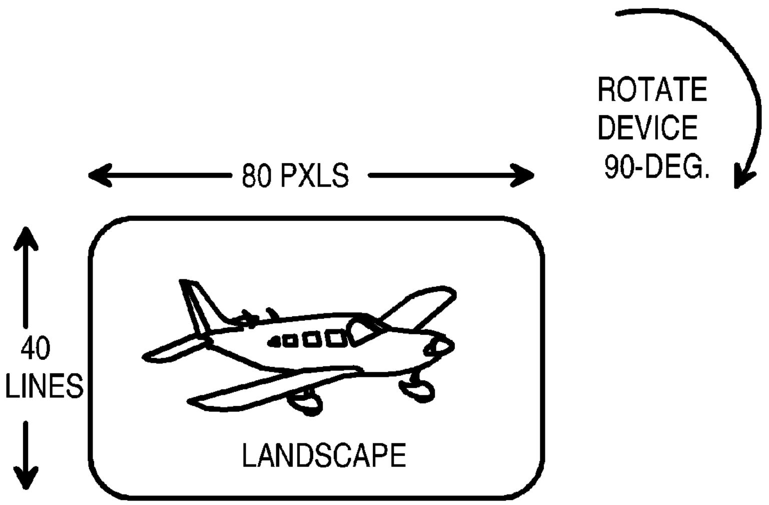
FIG. 1C PRIOR ART

NEW OFFSET FOR BLK_C
OFFSET = OFFSET' x B MOD BFR SIZE-1
9 x X =27 MOD 17 = 10

LBADDR= 10+ 10 - 17 = 3
WRAP-AROUND AGAIN,
DISPLAY 36, 26, ETC.

| OFFSET | PIXEL |
| --- | --- |
| 0 | 56 |
| 10 | 46 |
| 3 | 36 |
| 13 | 26 |
| 6 | 16 |
| 16 | 06 |

DISPLAY ROTATION USING A SMALL LINE BUFFER AND OPTIMIZED MEMORY ACCESS

FIELD OF THE INVENTION

This invention relates to graphics display systems, and more particularly rotation of image data.

BACKGROUND OF THE INVENTION

Graphics or video data is often stored in a frame buffer memory and then continuously read out of the buffer to the display in a scan order. The reading of pixels from the frame buffer to the display is known as display refresh. Typically the frame buffer has its data organized to match the physical organization of the display. Displays usually accept data on a line-by-line basis, starting with the top-left pixel from the first line, then continuing with other pixels in the first line from left to right. Pixels in the second line from the top of the screen are accepted in left-to-right order, and the scanning continues from left to right and from top to bottom.

Sometimes the graphics data needs to be rotated. FIGS. 1A-C show original and rotated graphics data on a display. In FIG. 1A, a display has 80 lines, and each line has 40 display pixels. An image is stored in the frame buffer and displayed in a portrait mode. However, some images may be better displayed to the user by being rotated. For example, a spreadsheet, text article, or image on a web page may be wider than can fit within the 40 pixels per line, causing some of the graphics data to be truncated. by 90 degrees in a clock-wise rotation.

In FIG. 1B, this graphics data has been rotated by 90 degrees so that the graphics data is displayed as 40 lines of 80 pixels per line. In FIG. 1C, the user now has to physically turn the device by −90 degrees (270 degrees) to see the data in a landscape mode.

Of course, the graphics data could be rotated before storage into the frame buffer, such as by a rendering engine or other device that writes the graphics data into the frame buffer. The engine could also read out the frame-buffer data, rotate it, and then write the rotated data back into the frame buffer. However, such rendering operations are complex and may not be supported.

For example, a small hand-held device such as a personal digital assistant (PDA) or a cell phone may have a small display. Sometimes the graphics data in the frame buffer may need to be quickly rotated after it has been written in. For example, the user may press a rotate-display button and then manually turn the PDA or cell phone by 90 or 270 degrees. The existing graphics data in the frame buffer then needs to be displayed in a rotated order from the frame buffer, which still stores the graphics data in the un-rotated order.

FIG. 2 shows pixel scan order for normal and rotated display modes. In FIG. 2A, the normal, un-rotated scan mode reads pixels from frame buffer 10 from the upper left. First pixel 00 is read and displayed, then pixels 01, 02, 03, 04 . . . 09 in the top line. Then the left-most pixel in the second line, pixel 10, is read and displayed, followed by other pixels 11, 12, 13, . . . in the second line. Then pixels 20, 21, 22, 23, . . . in the third line are read and displayed on a non-rotated display (not shown).

Reading of pixels from frame buffer 10 can be accelerated by using burst reads. Some memory devices allow for burst-access reads that are faster overall than many individual reads. Several pixels of data may be read out at about the same time using burst reads. For example, four pixels may be read in a burst, but only when these four pixels are in the same line and are located together in a group. Pixels 40, 41, 42, 43 may be read together as a burst-read, while pixels 44, 45, 46, 47 could be another burst read, etc. Other lines could also use burst reads, such as pixels 00, 01, 02, 03 in the top line, etc. Each line of 10 pixels requires only 3 burst reads, rather than 10 individual reads. Thus to read all 5 lines requires 5×3 or 15 burst reads.

In FIG. 2B, graphics data from frame buffer 10 is read out in rotated order and displayed on display 12 in rotated order. Pixels must be sent to display 12 in rotated-scan order from the top-left, starting with pixel 40. The first line displayed has pixels 40, 30, 20, 10, 00, which are the first column of pixels in frame buffer 10. Then the second line displayed has pixels 41, 31, 21, 11, 01, which is the second column from frame buffer 10.

Thus frame buffer 10 needs to be read column-wise from the bottom up, and then from left to right. This rotated scan order of reading frame buffer 10 is inefficient, since burst accesses cannot be used. Pixels must be delivered to display 12 exactly in the rotated scan order to be properly displayed. Since pixels 40, 30, 20, 10 are in different rows of frame buffer 10, they cannot be read together as a single burst access. Instead, four individual reads are required. Thus all pixels must be read individually. While un-rotated data can use just 15 burst-read accessed, 50 read accesses are needed for the rotated scan order.

The pixels from frame buffer 10 could be copied to an intermediate full-frame buffer and re-arranged into the rotated scan order so that burst-reads could be used. However, this wastes memory as two frame buffers are needed, and frame buffers can be large.

What is desired is an efficient way to read graphics data from a frame buffer when the data must be rotated before display. Rotating graphics data from an un-rotated frame buffer using a smaller buffer is desirable. A smaller buffer for use in rotating graphics data that is not a full-frame buffer is desirable.

BRIEF DESCRIPTION OF THE DRAWINGS

FIGS. 1A-C show original and rotated graphics data on a display.

DETAILED DESCRIPTION

The present invention relates to an improvement in display rotation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that a multi-line buffer can be used, between the frame buffer and a rotated display, to re-order pixels. When the frame buffer can be more efficiently read using burst accesses of B pixels per burst, the line buffer can hold B lines. Thus the size of the line buffer may be related to the burst size. The lines in stored in the line buffer have the length of the displayed line, which is the column height in the frame buffer with un-rotated data.

The pixel data is stored in the B-line buffer in an intermediate ordering that is neither the un-rotated order of pixels in the frame buffer, nor the final display order on the rotated display. Instead, the order of pixels in the B-line buffer is designed to efficiently allow for pixel re-ordering.

Figure 2A:
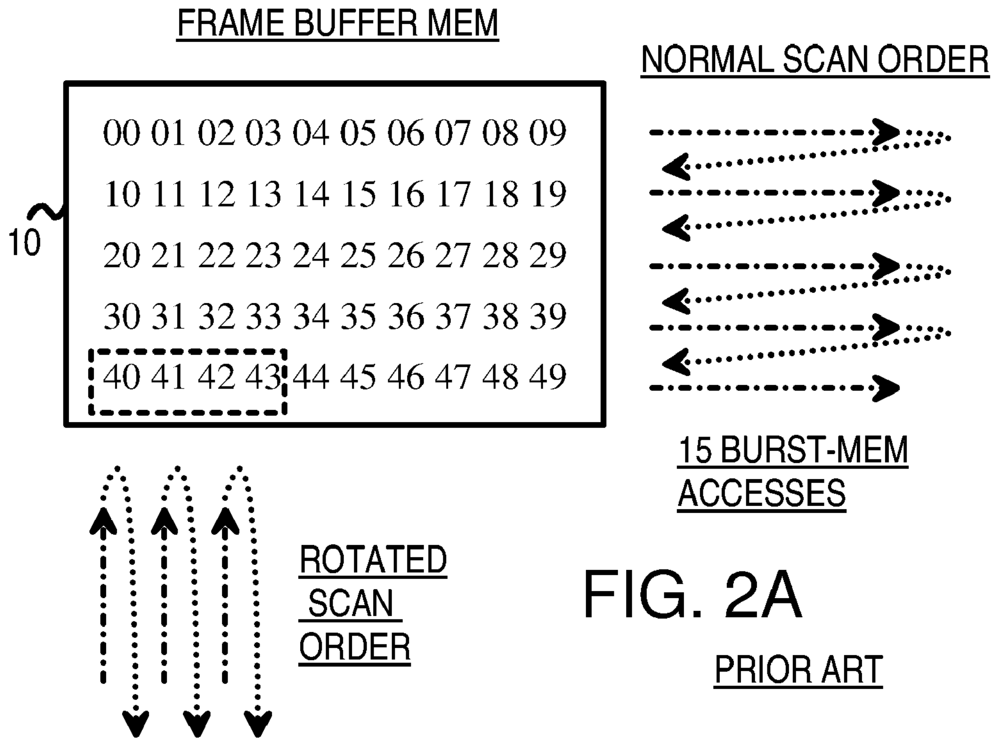
FIG. 2A PRIOR ART
FIG. 2 shows pixel scan order for normal and rotated display modes.
Figure 2B:
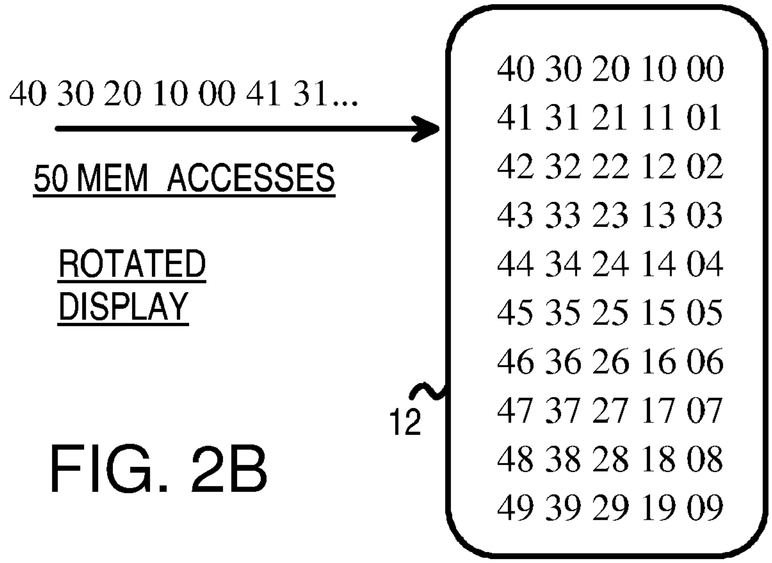
FIG. 2B PRIOR ART
Figure 3:
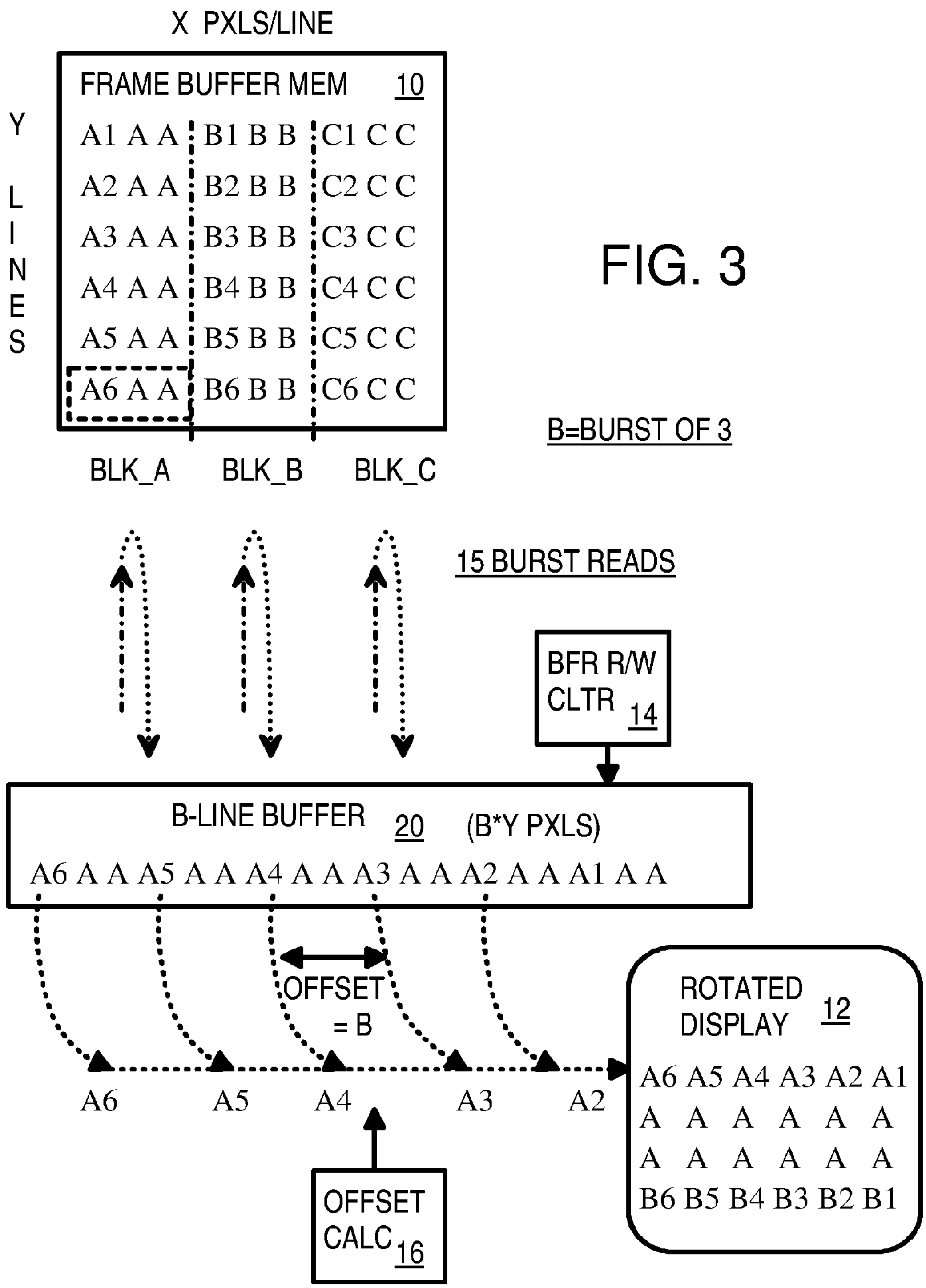
FIG. 3 is an overview of pixel re-ordering in a line buffer between the frame buffer and a rotated display.

FIG. 3 is an overview of pixel re-ordering in a line buffer between the frame buffer and a rotated display. Frame buffer 10 contains pixels in a non-rotated order of X pixels per line and Y lines per frame. The memory of frame buffer 10 may be accessed using burst reads, which read several adjacent pixels on one line. For example, pixels A6, A, A on line 6 may be read together in one burst, while pixels B6, B, B that follow on line 6 are read during another burst.

Bursts typically can occur along a same row in the physical memory, so lines of pixels are stored along one or more rows in the memory to minimize row-crossings that would require separate burst accesses. The pixel names used are just for illustrative purposes. Different pixels may use the same generic label but can be different pixels of different colors. For example, many pixels are generically labeled A to show they are part of block A, but they can have different colors. Other unique pixels labeled A1, A2, etc are labeled as such to highlight their locations in frame buffer 10 and later in line buffer 20 and rotated display 12. This helps to show how pixels are copied to line buffer 20 and then to display 12.

Frame buffer 10 can be divided into blocks that are each B pixels wide. For example, with a burst of 3 pixels, each block is 3 pixels wide and Y lines in height. Block A has pixels A1, A, A in the first row, pixels A2, A, A in the second row, etc, finishing with pixels A6, A, A in the last row. Block B has pixels B1, B, B in the first row, pixels B2, B, B in the second row, etc, finishing with pixels B6, B, B in the last row. Block C has pixels C1, C, C in the first row, pixels C2, C, C in the second row, etc, finishing with pixels C6, C, C in the last row.

Rather than read across a row of frame buffer 10, burst reads are performed upward in blocks that are the width of the burst read. All of block A is read first, starting with the three pixels A6, A, A of the last row, then a burst of three pixels A5, A, A in the penultimate row, then a burst of three pixels A4, A, A in the fourth row. A burst of 3 pixels A3, A, A are next read from the third row, then pixels A2, A, A in the second row. Finally pixels A1, A, A are read from the first row, and block A has been fully read.

Line buffer 20 can hold B of the rotated lines, which are Y pixels in length. Thus line buffer 20 can hold Y*B pixels, which is the same number of pixels in each block. Thus line buffer 20 can hold one block of pixels. Buffer read/write controller 14 reads pixels from block A of frame buffer 10 and writes them into line buffer 20 to initially fill line buffer 20 with block A pixels. Then buffer read/write controller 14 reads out pixels from line buffer 20 for display on rotated display 12.

However, pixels are not read out of line buffer 20 sequentially. Instead, offset calculator 16 calculates an offset value that is used to find the next pixel to read and display. Initially the offset is the burst value B (3 in this example), and offset calculator 16 causes buffer read/write controller 14 to read pixels from line buffer 20 that are spaced apart by B pixels. The first pixel read is at the first location in line buffer 20, which stores pixel A6. This pixel is displayed in the upper left corner of rotated display 12.

The next pixel read from line buffer 20 is one offset away, which is pixel A5. Adding the offset of 3 to the current position produces the location of pixel A4. Again adding the offset to this position locates pixel A3. Pixel A2 another offset away is read next, followed by pixel A1. Thus the first line read from line buffer 20 and displayed on rotated display 12 contains pixels A6, A5, A4, A3, A2, A1. These were at positions 1, 4, 7, 10, 13, 16 (or 0, 3, 6, 9, 12, 15 if the first position is called 0 rather than 1). These pixels were the first column in frame buffer 10, so the pixels are properly rotated.

For B=3 and Y=6, line buffer 20 contains 18 pixel locations at index positions 1 to 18. Adding the offset 3 to the last index value overruns line buffer 20. Using a normal modulo addition with a module equal to the size of line buffer 20 (modulo 18) would wrap back to the first position. However, a reduced modulus of B*Y−1 is used to wrap the index. For line buffer 20 with 18 locations, a modulus of 17 is used. This causes offset calculator 16 and buffer read/write controller 14 to wrap the index back to the second location rather than the first location. This has the effect of shifting over the writing of the next pixels by one, distributing locations within line buffer 20.

For example, adding the offset of 3 to the last location read (16) produces 19, which is 2 in modulo-17, since the modulus of 17 is subtracted from 19. Thus the next pixel read is at position 2. Pixels A are read from positions 2, 5, 8, 11, 14, 17 and displayed as the second line of rotated display 12. Then adding 3 to 17 produces 20, which is 3 after subtracting the modulus of 17. Thus the third line is read from positions 3, 6, 9, 12, 15, 18 and displayed as pixels A.

While line buffer 20 could be fully emptied of pixels from block A before writing in pixels from block B, the inventor has discovered that block B pixels may be written into line buffer 20 as soon as block A pixels are read out and displayed. However, the locations written by block B pixels follow the block-A read order rather than a sequential order. The first pixel in block B, pixel B6, over-writes pixel A6. However, the next pixels A, A in positions 2, 3 of line buffer 20 are not read and displayed until much later. The next opening in line buffer 20 occurs at position 4 as pixel A5 is read out. Pixel B to the right of pixel B6 is written into this location. The third pixel of the burst read B6, B, B of the last line of block B is written to location 7 of line buffer 20, over-writing pixel A4.

Thus pixels are written into line buffer 20 at offsets, rather than sequentially. Furthermore, the offset changes from block to block as is described in more detail later. Block B has an offset of 3, but block C has an offset of 9.

While somewhat complex, this increasing-offset method allows pixels to be written into line buffer 20 as soon as prior-block pixels are read out for display. Burst reads could wait until B or more openings are created in line buffer 20.

Figure 4A:
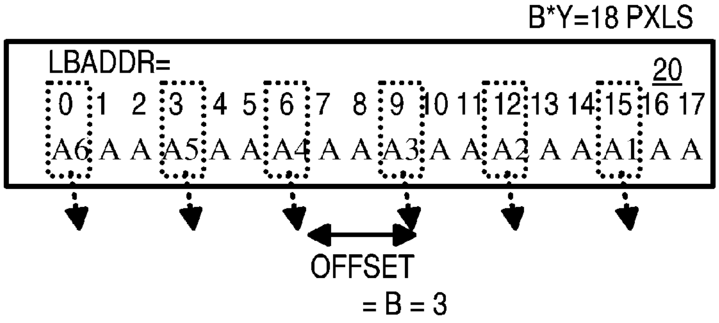
FIGS. 4A-C highlight reading and writing pixels by offset in the burst-line buffer.
Figure 4B:
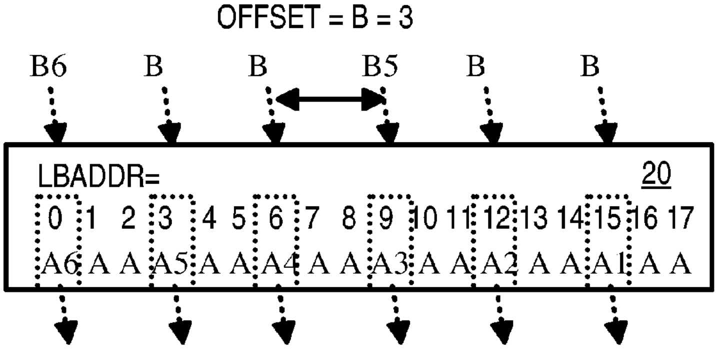
Figure 4C:
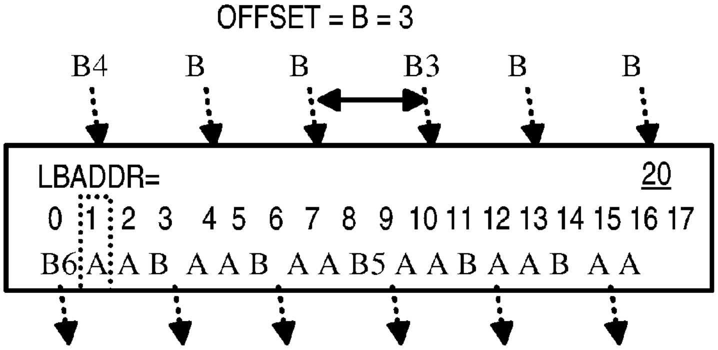

FIGS. 4A-C highlight reading and writing pixels by offset in the burst-line buffer. In FIG. 4A, line buffer 20 is initially filled with pixels from block A of frame buffer 10, starting with the three pixels A6, A, A of the last frame-buffer row, which are stored in the first three positions. Index positions in line buffer 20 may be identified by a logical buffer address (LBADDR), which start at 0 and continue until 17 in this example. The size of line buffer 20 is B*Y pixels, or 18 for a burst of 3 and 6 pixels per rotated line (or rows per column in un-rotated frame buffer 10).

The second burst of three pixels A5, A, A in the penultimate row, are stored in positions 4, 5, 6 (LBADDR=3, 4, 5). The next burst of three pixels A4, A, A in the fourth row are stored in positions 7, 8, 9 (LBADDR=6, 7, 8). The final burst of pixels A1, A, A are stored at the end of line buffer 20 at positions 16, 17, 18 (LBADDR=15, 16, 17).

Pixels in block A are read from line buffer 20 using the offset. The initial offset is B, or 3 in this example. The first pixel read is at the first location in line buffer 20, which is pixel A6 at LBADDR=0. The next pixel read from line buffer 20 is one offset away, which is pixel A5 at LBADDR=3. Adding the offset of 3 to LBADDR=3 produces LBADDR=6, which is the location of pixel A4. Again adding the offset to LBADDR=6 produces LBADDR=9, where pixel A3 is stored. Pixel A2 at LBADDR=12 is read next, followed by pixel A1 at LBADDR=15. Thus the first line read and displayed from line buffer 20 and displayed on rotated display 12 contains pixels A6, A5, A4, A3, A2, A1. These were at LBADDR 0, 3, 6, 9, 12, 15.

In FIG. 4B, pixels in block B are written into line buffer 20 as buffer openings are created as block-A pixels are read and displayed. The locations written by block B pixels follow the block-A read order rather than a sequential order.

The first pixel in block B, pixel B6, over-writes pixel A6, which was the first pixel read. However, the next pixels A, A in positions 1, 2 of line buffer 20 are not read and displayed until much later. The next opening in line buffer 20 occurs at position 3 as pixel A5 is read out. Pixel B to the right of pixel B6 is written into this location. The third pixel of the burst read B6, B, B of the last line of block B is written to location 6 of line buffer 20, over-writing pixel A4.

The second burst read from frame buffer 10 reads pixels B5, B, B, which are over-write pixels A3, A2, A1 at LBADDR=9, 12, 15, respectively once these A-block pixels have been read for display.

In FIG. 4C, pixel reading and writing have wrapped around in line buffer 20. After pixel A1 is read from LBADDR=15, adding the offset of 3 produces 18, which overruns line buffer 20. A reduced modulus of B*Y−1 is used to wrap the LBADDR index. For line buffer 20 with 18 locations, a modulus of 17 is used. This wraps the index back to the second location (LBADDR=1) rather than the first location. For example, adding the offset of 3 to the last LBADDR read (15) produces 18, which is 1 in modulo-17, since the modulus of 17 is subtracted from 18. Thus the next pixel read is at the second position, LBADDR=1.

Pixels A are read from index positions 1, 4, 7, 10, 13, 16 and displayed as the second line of rotated display 12. Pixels B4, B, B B3, B, B are written to these same positions as shown in FIG. 4C. The index then wraps again to LBADDR=2, and the third line of pixels A is read from index positions 2, 5, 8, 11, 14, 17 and displayed as the third line of rotated display 12. These locations are filled with pixels B2, B, B B1, B, B, respectively (not shown).

Figure 5:
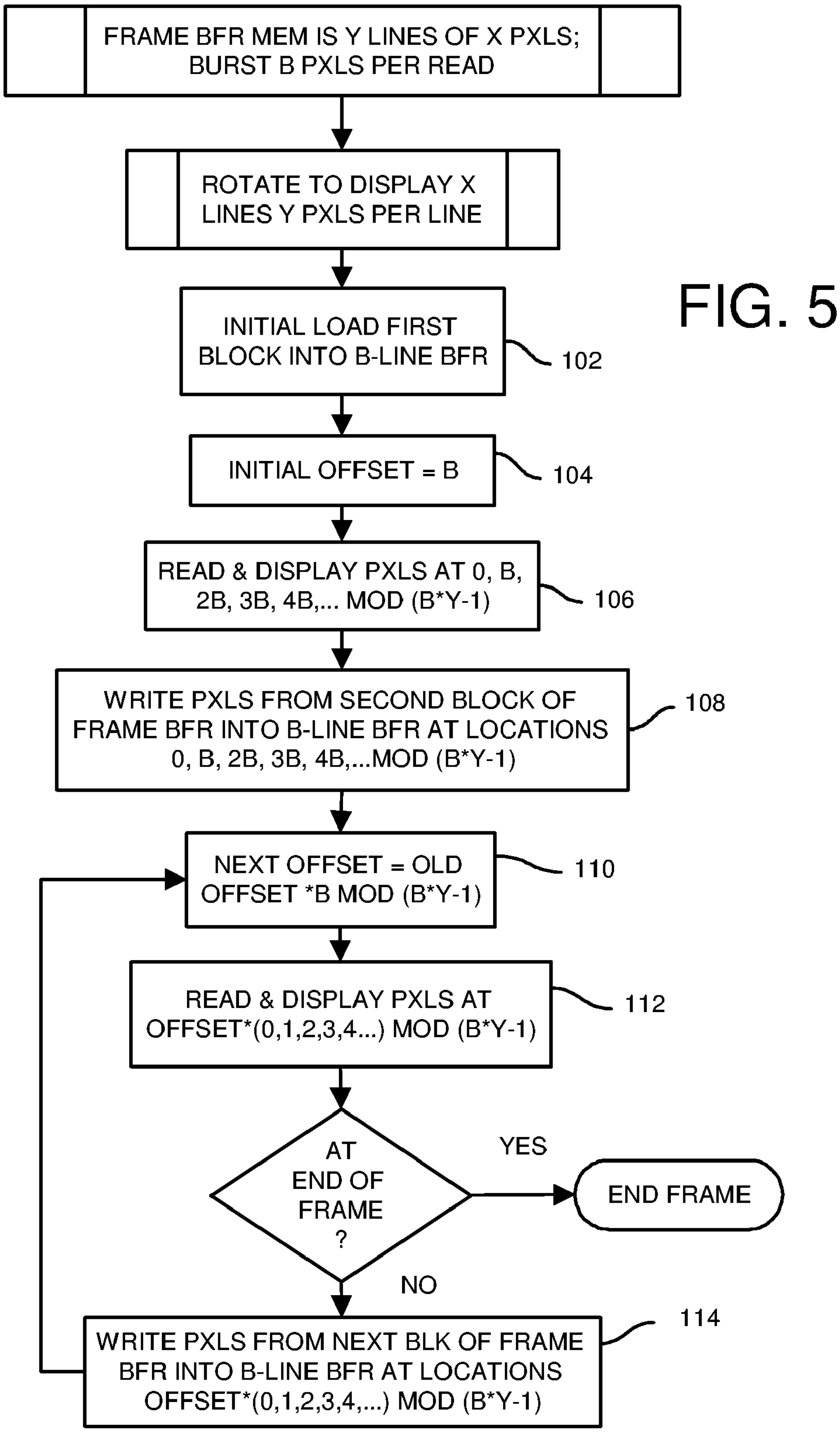
FIG. 5 is a flowchart of bursting pixels into a multi-line buffer while using an increasing-offset read-order to rotate pixels.

FIG. 5 is a flowchart of bursting pixels into a multi-line buffer while using an increasing-offset read-order to rotate pixels. Burst reads can read B pixels per burst read when the pixels are in a same memory row. A frame buffer memory has Y lines and X pixels per line and is to be rotated to display X lines of Y pixels per line. X and Y may define a subset of a larger image in a frame buffer that is to be rotated and displayed. The frame buffer stores the pixels row-wise, where the X pixels in a line are in one or just a few memory rows, while the Y pixels in a column of different lines are stored in as many as Y memory rows.

The frame buffer can be divided into several blocks. Each block has Y lines but only B pixels per line, or B*Y pixels. There are X/B blocks. The method is most efficient when X is a multiple of B.

Initially all the pixels in the first block are written into the line buffer, step 102. The pixels are written in bursts of B pixels within one line, but each burst read is from a different line in the frame buffer. The lines are read in reverse (bottom-up) order, rather than the top-down scan-line order typically used by un-rotated displays. This is being called a burst bottom-up reading order.

The initial offset is set to equal the burst size in pixels, B, step 104. The pre-initial offset could be set to 1 during the initial load of step 102, and then set to B in step 104.

Pixels from the first block are read and displayed by reading the line buffer using the offset. Pixels at line-buffer locations 0, B, 2B, 3B, 4B, . . . etc. are read and displayed, step 106. This is the correct order for display on the rotated display. When the index value overruns the size of the line buffer, the reduced modulus of B*Y−1 is subtracted to wrap the index to the beginning of the line buffer. This continues until all B*Y pixels in the first block have been read, from positions 0, B, 2B, 3B, . . . (N*B)mod(B*Y−1), until the block's last pixel is reached at N=B*Y−1.

Writing step 108 occurs concurrently with reading step 106. As pixels in the first block are read and displayed by step 106, their memory locations in line buffer 20 are freed up and may be re-used. Pixels from the second block are read from frame buffer 10 in the same burst bottom-up reading order as was described in step 102 for the first block. However, these pixels are written into line buffer in the same offset read order of step 106. Pixels are written at B-offset locations 0, B, 2B, 3B, . . . (N*B)mod(B*Y−1), until the second block's last pixel is reached at N=B*Y−1 during writing step 108.

Each write in writing step 108 may occur as soon as B locations are read in reading step 106, or as soon as one location frees up, if burst reads are not used, or if the pixels in the burst read are stored in a temporary burst-read buffer. Writes may occur in bursts, or individually. Alternately, writing step 108 may be delayed somewhat, such as occurring after 2B or 5B or some other amount of reads have occurred. The delay may be variable and increase due to memory or other resource sharing and arbitration.

When there are still more blocks of pixels to read from the frame buffer, processing continues for the next block. The new offset for the next block is generated, step 110. The new offset is the old offset multiplied by B in modulo B*Y−1.

The offset for reading a block is larger than the offset for writing that same block. For example, the first block A is block K=0. Pixels are written in sequentially, so the write offset is 1. However, these block A pixels are read out with an offset of B. Thus for block K=0, the read offset is B while the write offset is 1.

For the second block, K=1, the write offset matches the read offset of the prior block (K=0) since the writing matches the reading as pixels are written into openings left by reading the prior-block's pixels. Thus the write offset for block K=1 is B. However, the read offset for this second block is B*B. The B*B read offset is then used as the write offset for the next block, the third block with K=2.

In general, the write offset of a block K is BK, with the first block having K=0 and a write offset of 1. The read offset of a block K is B(K+1). Thus the read offset is always larger than the write offset by a factor of B.

Of course, once the offset exceeds the size of the line buffer, then the offset is wrapped around since the offset is calculated in the reduced modulus. So when an offset wrap occurs, the new offset can be less than the old offset due to the modulo arithmetic. Thus the offset increases with each new block, but can wrap around to smaller values due to the modulus.

For example, when B=3, the first block is K=0 and has a write offset of 1 and a read offset of 3. The second block K=1 has a write offset of 3 and a read offset of 9. The third block K=2 has a write offset of 9 and a pre-wrap read offset of 27, which wraps back to an offset of 10 in modulo 17. The fourth block K=3 has a write offset of 10 and a pre-wrap read offset of 30 (10*B), which wraps back to an offset of 13 in modulo 17.

Pixels from the next block K are read and displayed by reading the line buffer using the new offset F=B**(K+1) modulo(B*Y−1). Pixels at line-buffer locations 0, F, 2F, 3F, 4F, . . . etc. are read and displayed, step 112. This is still the correct order for display on the rotated display. When the index value overruns the size of the line buffer, the reduced modulus of B*Y−1 is subtracted to wrap the index to the beginning of the line buffer. This continues until all B*Y pixels in the next block K have been read, from positions 0, F, 2F, 3F, . . . (N*F)mod(B*Y−1), until the block's last pixel is reached at N=B*Y−1.

When there are no more blocks of pixels to read from frame buffer 10, the process can end after reading step 112 completes. The entire process can be repeated for the next display frame. Otherwise, the next block of pixels is read from frame buffer 10 and written into line buffer 20 with writing step 114, which can occur concurrently with reading step 112.

As pixels in the next block K are read and displayed by step 112, their memory locations in line buffer 20 are freed up and may be re-used. Pixels from the following block K+1 are read from frame buffer 10 in the same burst bottom-up reading order as was described in step 102 for the first block. However, these pixels are written into line buffer in the same offset read order of step 112. Pixels are written at F-offset locations 0, F, 2F, 3F, . . . (N*F)mod(B*Y−1), until the new block's last pixel is reached at N=B*Y−1 during writing step 114.

Figure 6:
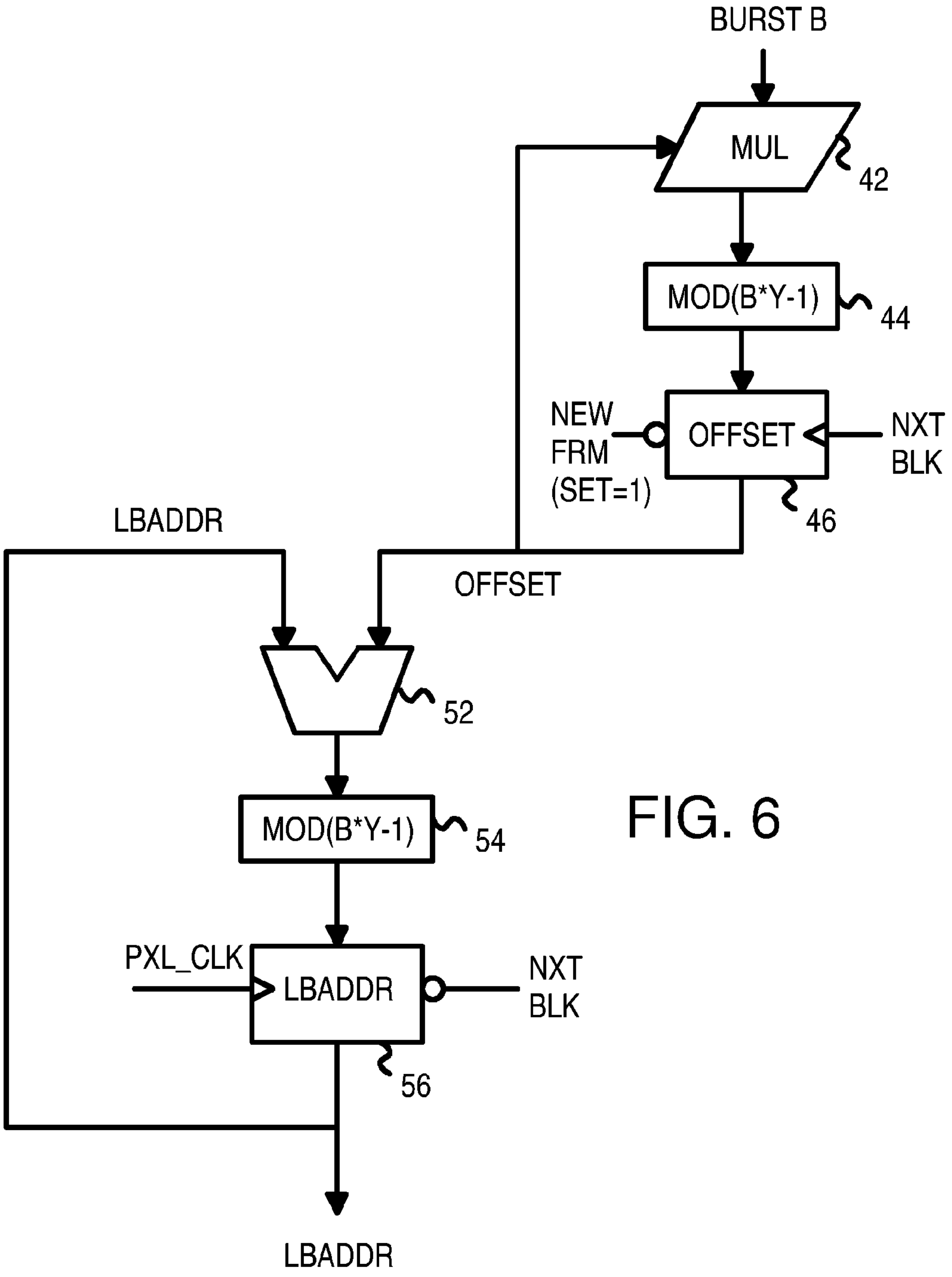
FIG. 6 is a diagram of offset and index address calculation.

FIG. 6 is a diagram of offset and index address calculation. The current offset is stored in offset register 46, which is set to one at the beginning of a new display frame. Offset register 46 is clocks in a new offset value at the beginning of reading each new block, starting with reading of the first block.

The first block is written using an offset of 1. This initial write offset is fed back to multiplier 42, which multiplies the last offset by burst value B to get the new offset before modulo adjustment. Then modulo unit 44 subtracts the reduced modulus as many times as is necessary until the result is less than the reduced modulus of B*Y−1. In some embodiments multiplier 42 can perform multiplication using the reduced modulus and a separate modulo unit 44 is not needed. At the start of reading the next block, this new offset is latched into offset register 46 and used for reading the block. Thus reading of the first block uses the new offset of the old offset multiplied by B and adjusted for the reduced modulus of B*Y−1. Writing of the second block also uses this offset used for reading the first block.

During reading, adder 52 adds the current read offset to the index address LBADDR to locate the next location to read. Modulo unit 54 converts the sum to the reduced modulus of B*Y−1, which is latched into address register 56 as the next LBADDR position to read or write in line buffer 20. A pixel clock used by the rotated display 12 can clock address register 56 for reads. Read address register 56 is cleared to zero at the start of each new block.

Since writing uses a different offset value that jumps its LBADDR by a different increment than for the concurrent reads, separate offset values can be maintained for read and writes, and separate LBADDR's can be stored for reads and writes. Two LBADDR address registers 56 can be maintained, and two offset registers 46, for read and write. The write address register 56 may be clocked by a frame buffer clock and may take into account burst reads of the frame buffer. Adders and multipliers and other logic could be shared and used at different times for updating read and write registers. Programmable logic or a programmed processor could be used. Many variations are possible.

Figure 7A:
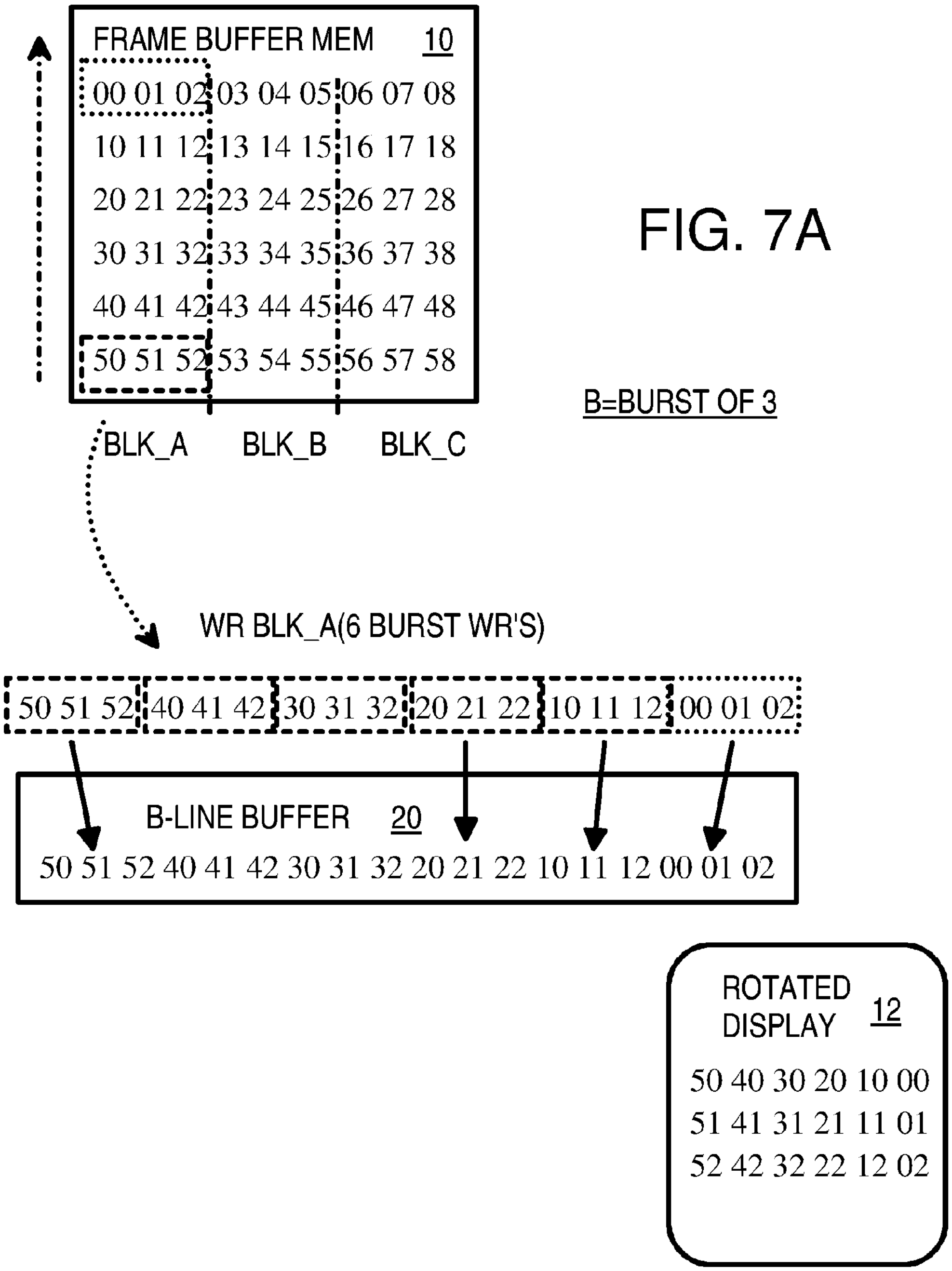
FIGS. 7A-O show an example of writing and reading the line buffer using increasing offsets to rotate pixels for display.
Figure 7B:
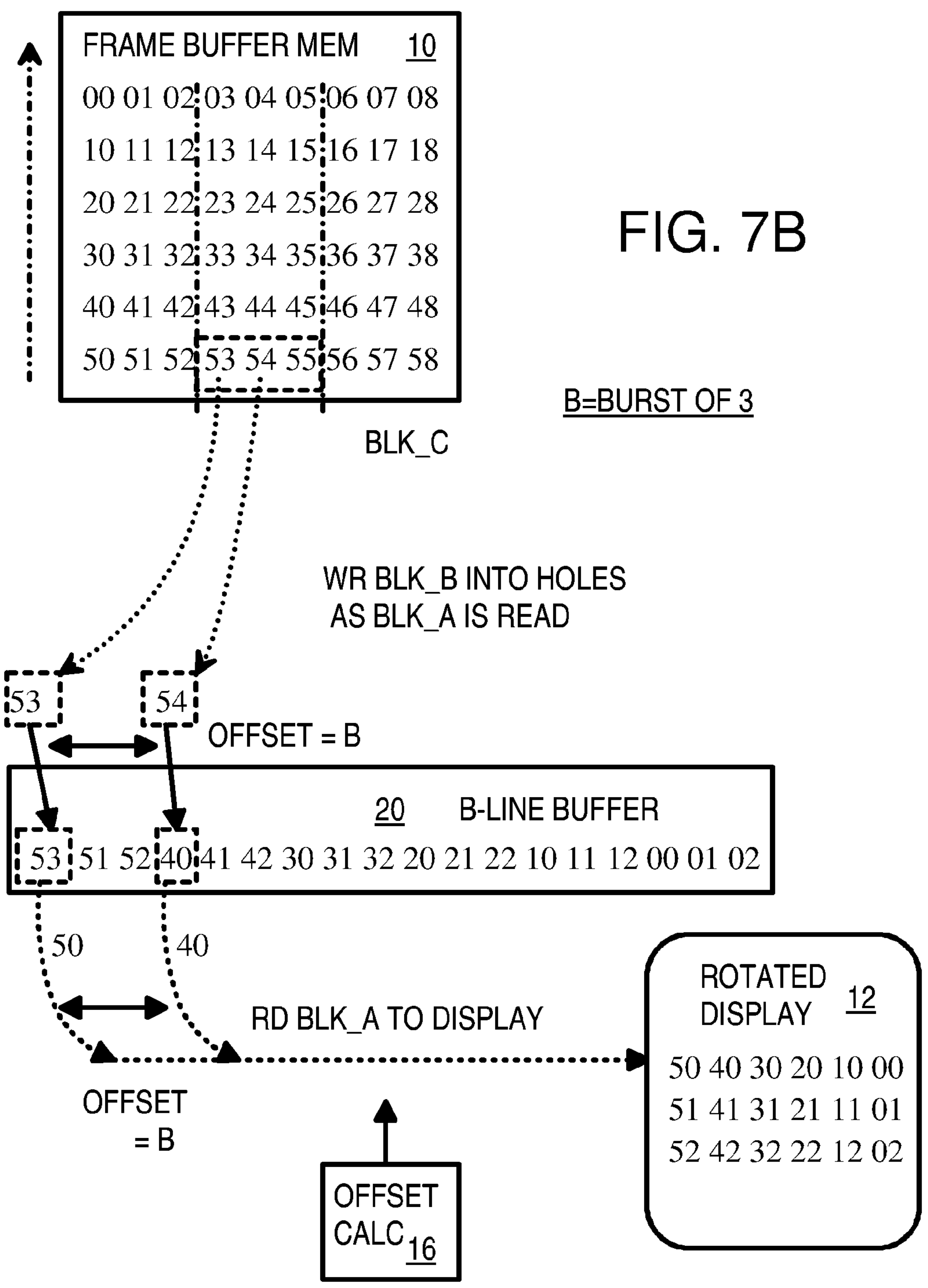
Figure 7C:
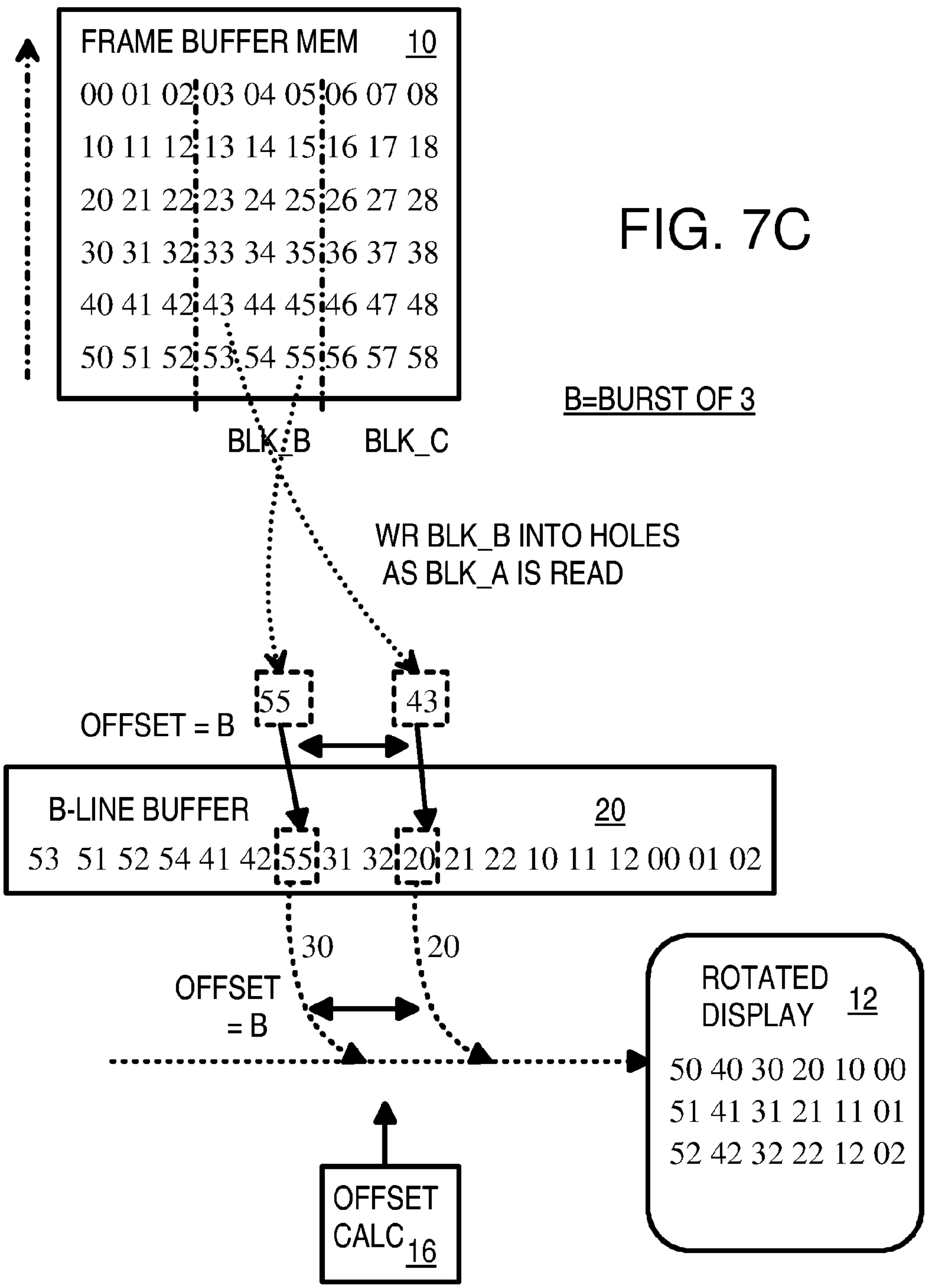
Figure 7D:
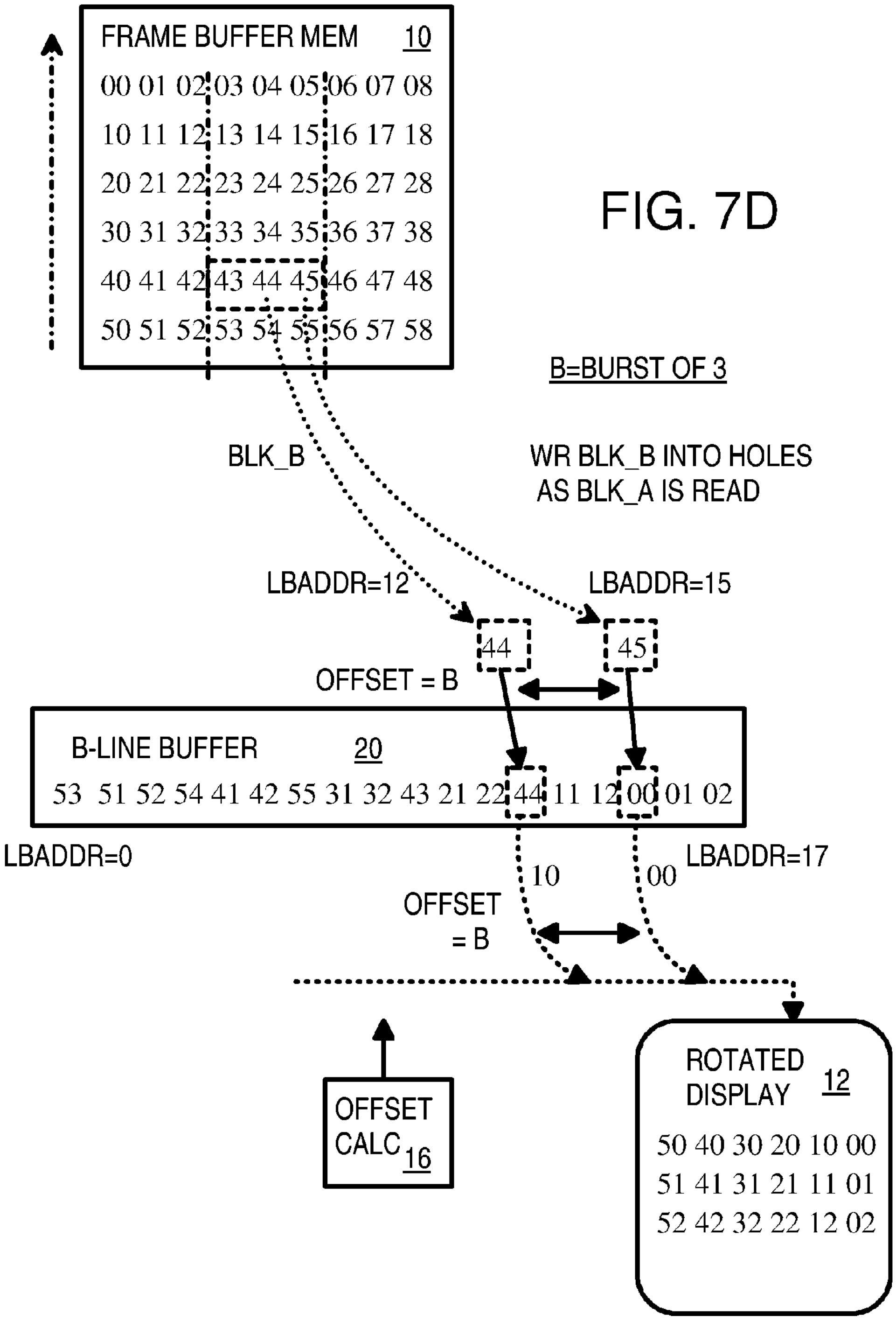
Figure 7E:
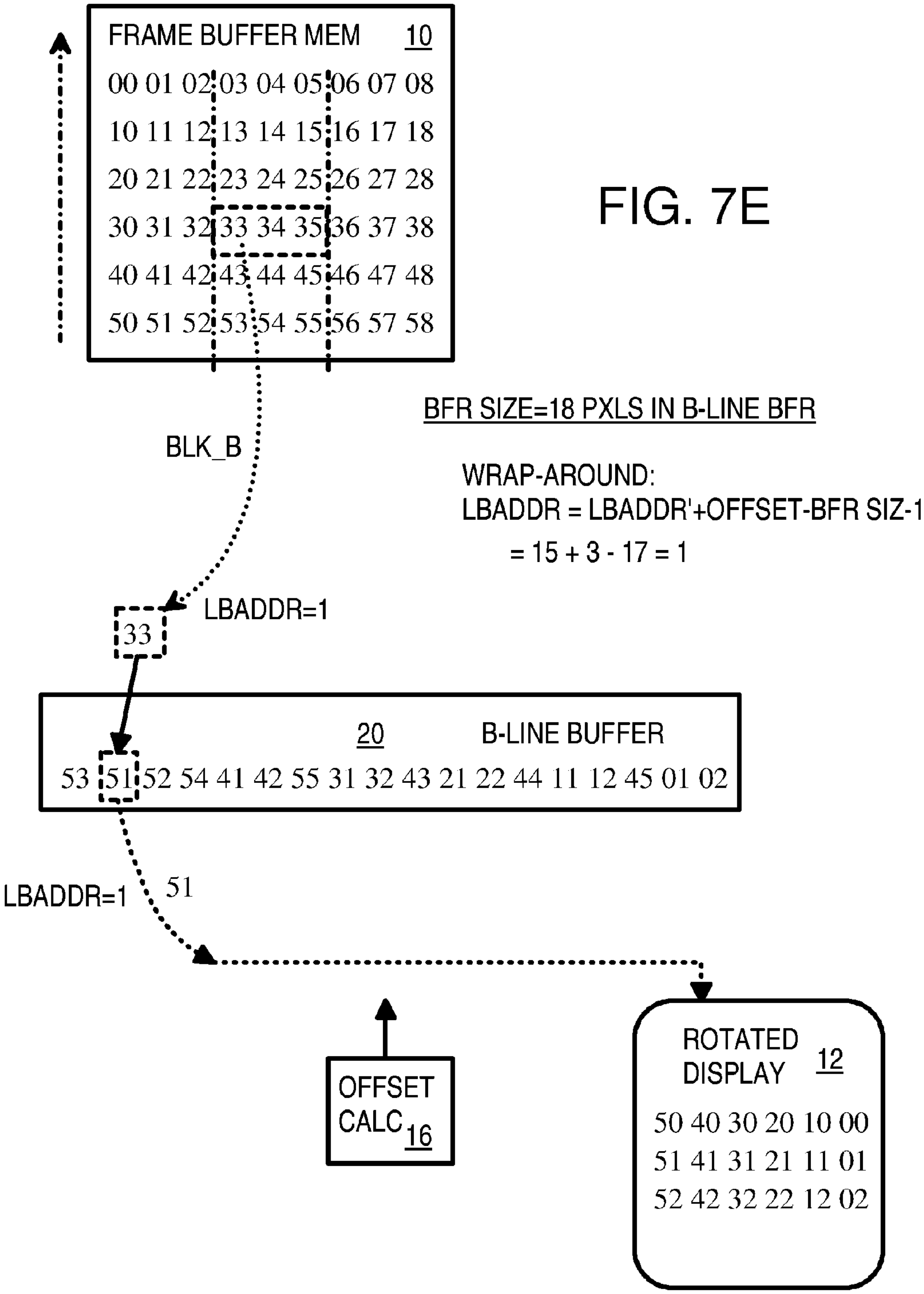
Figure 7F:
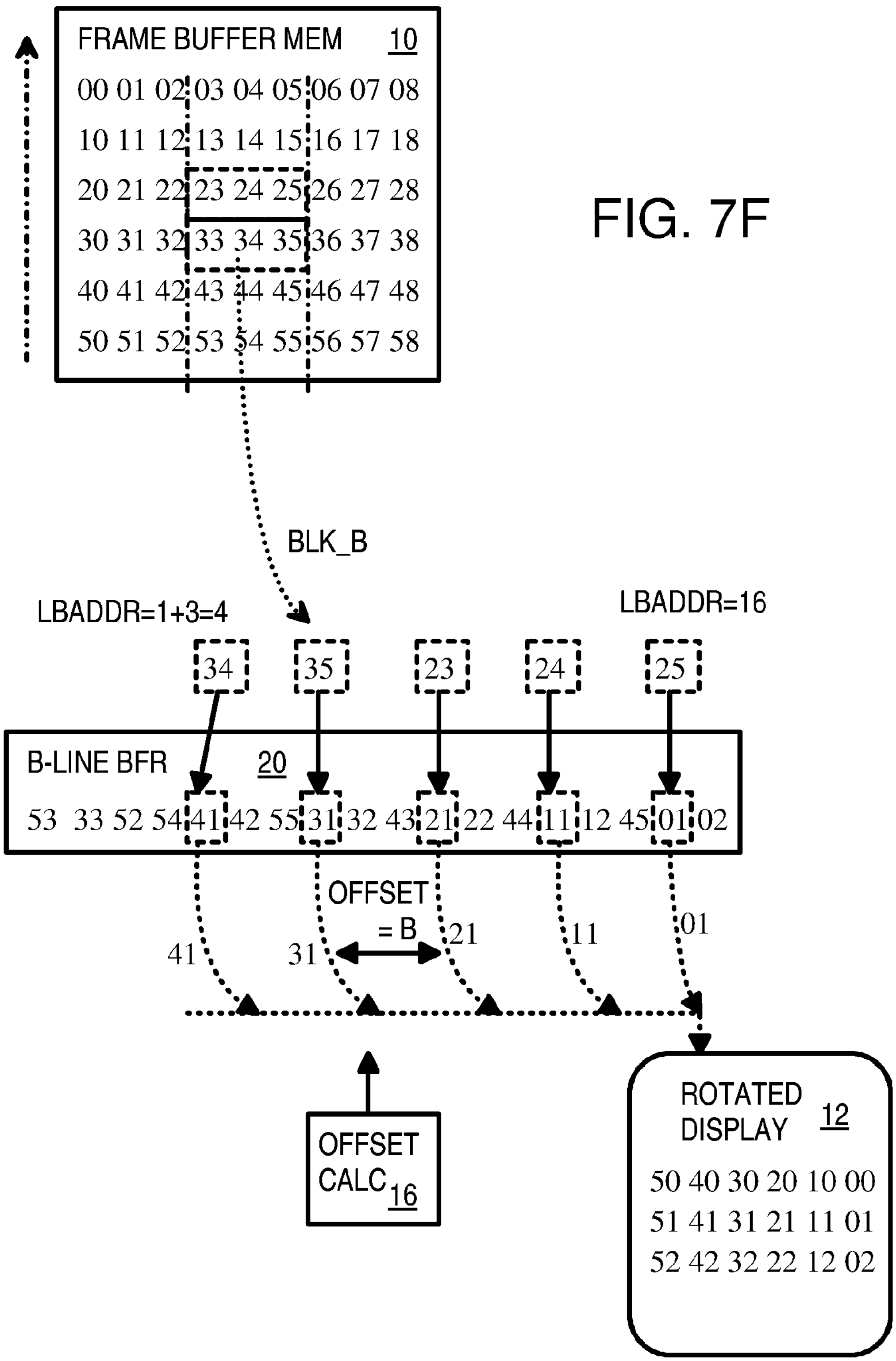
Figure 7G:
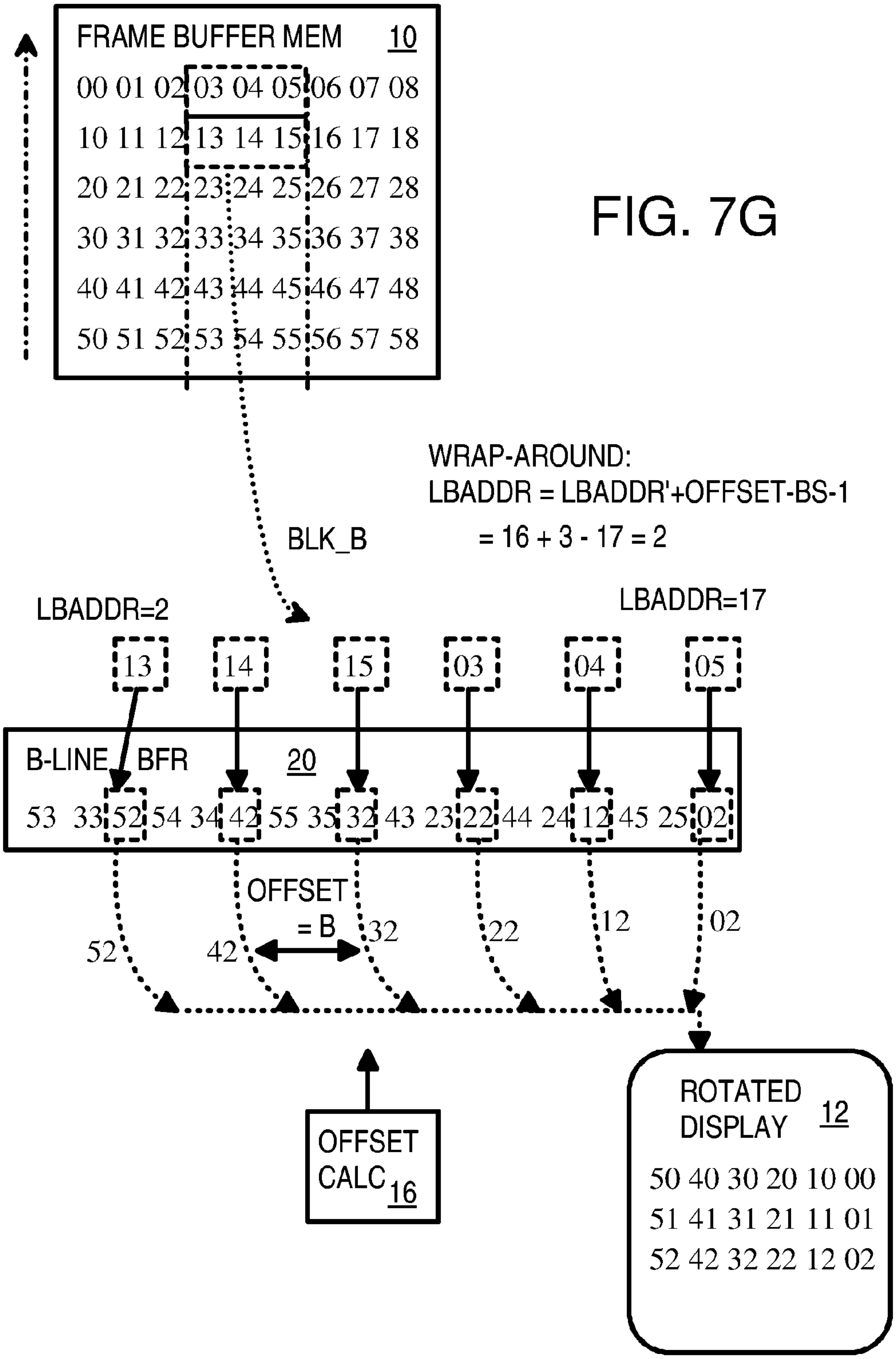
Figure 7H:
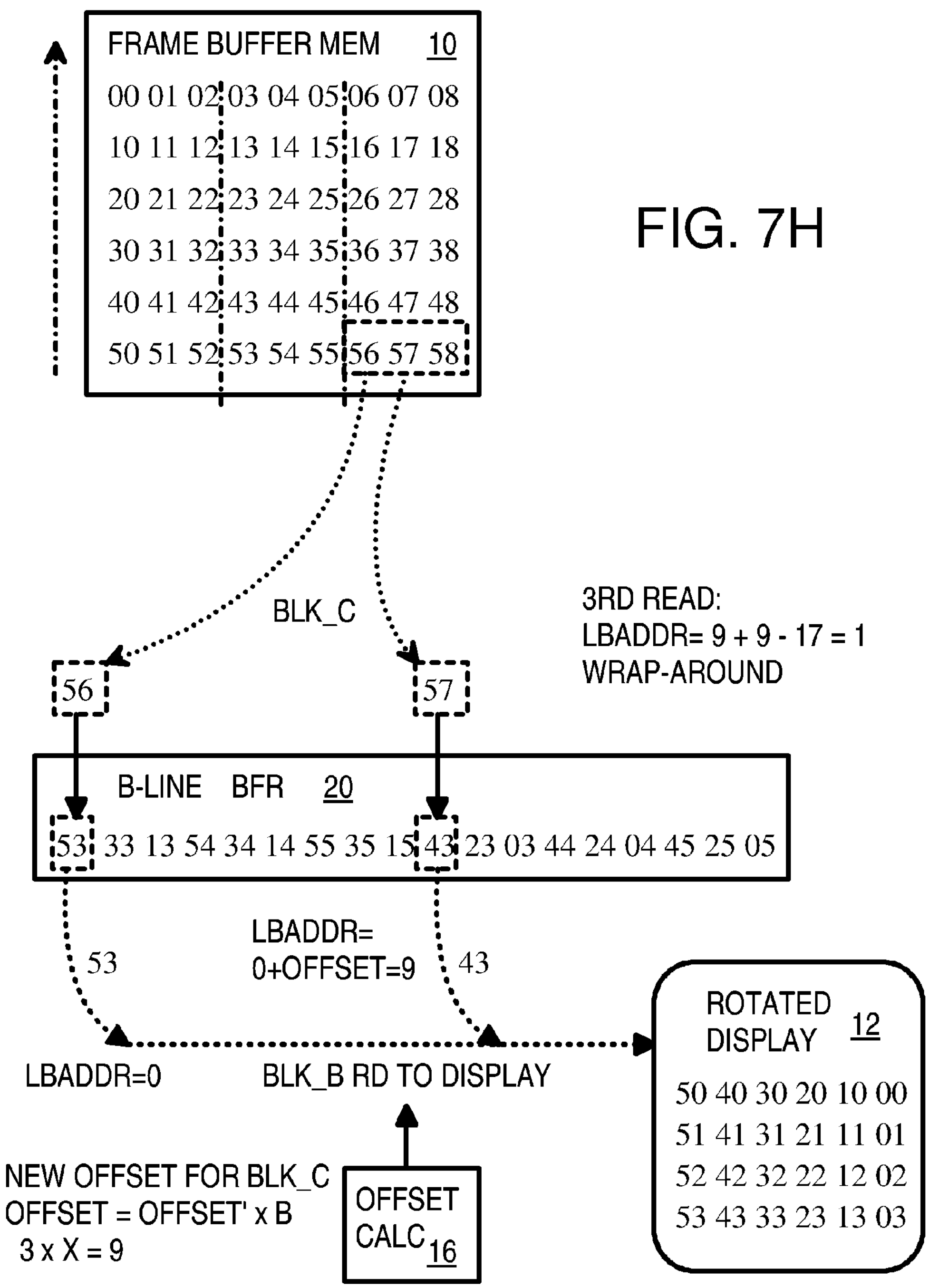
Figure 7I:
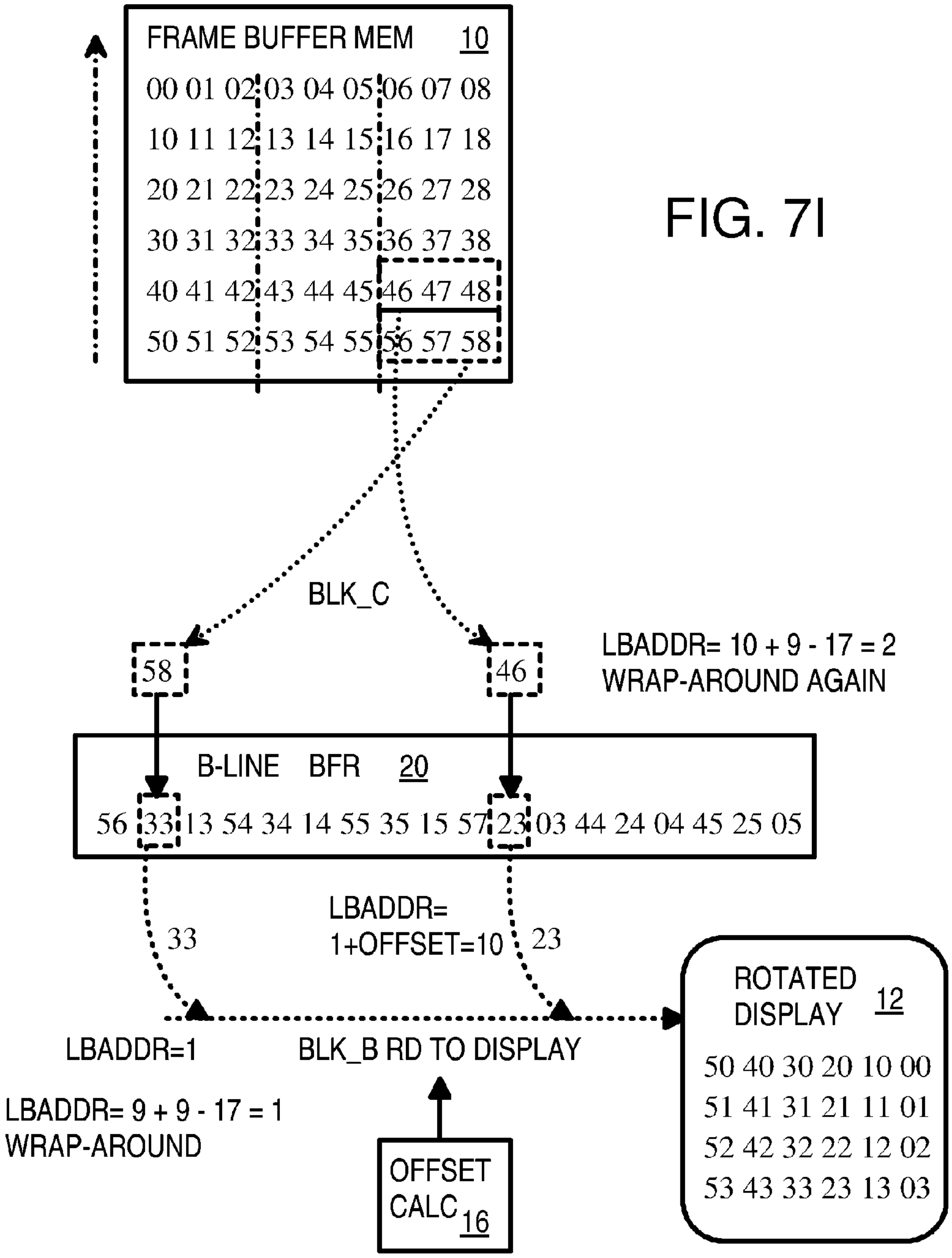
Figure 7J:
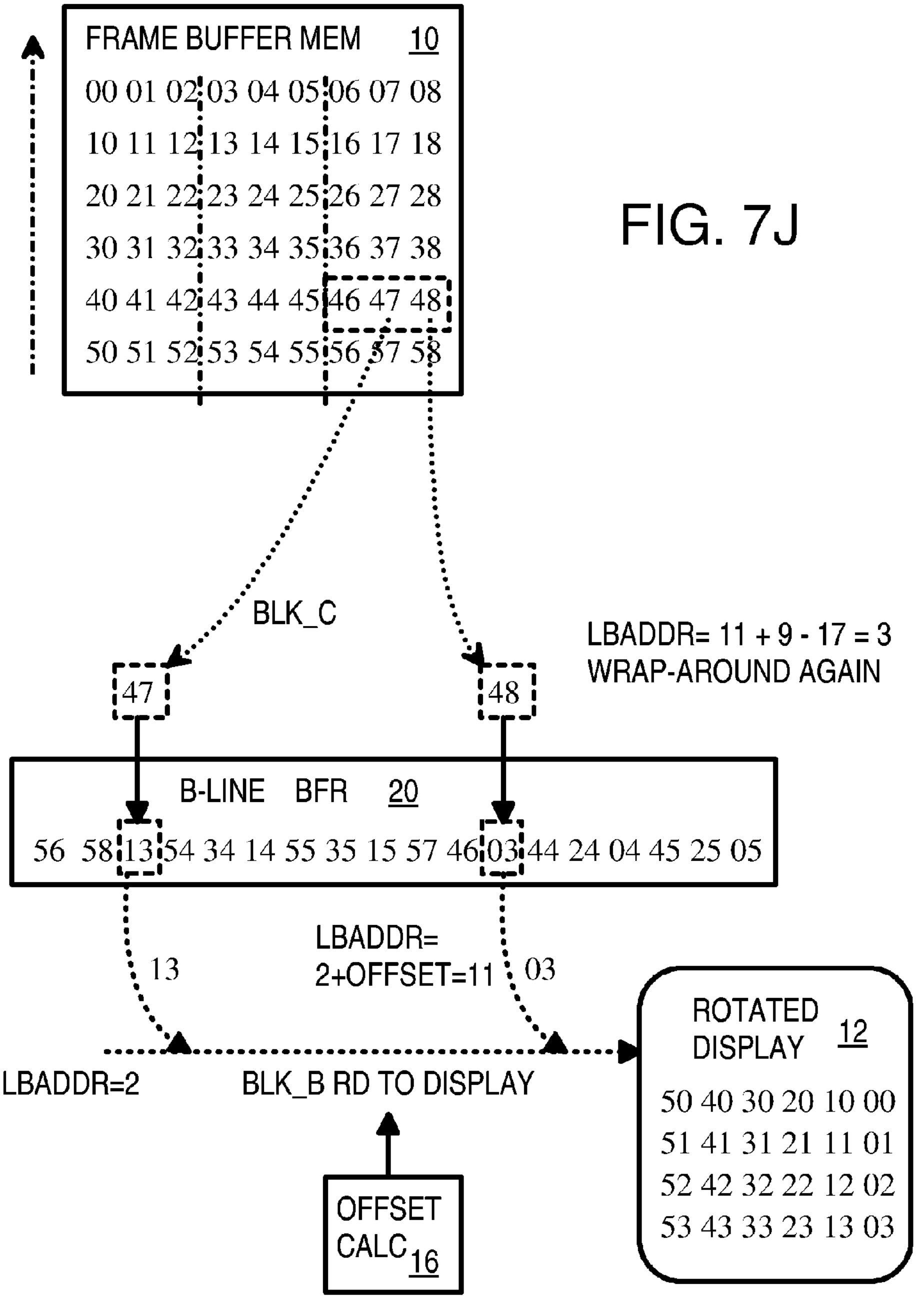
Figure 7K:
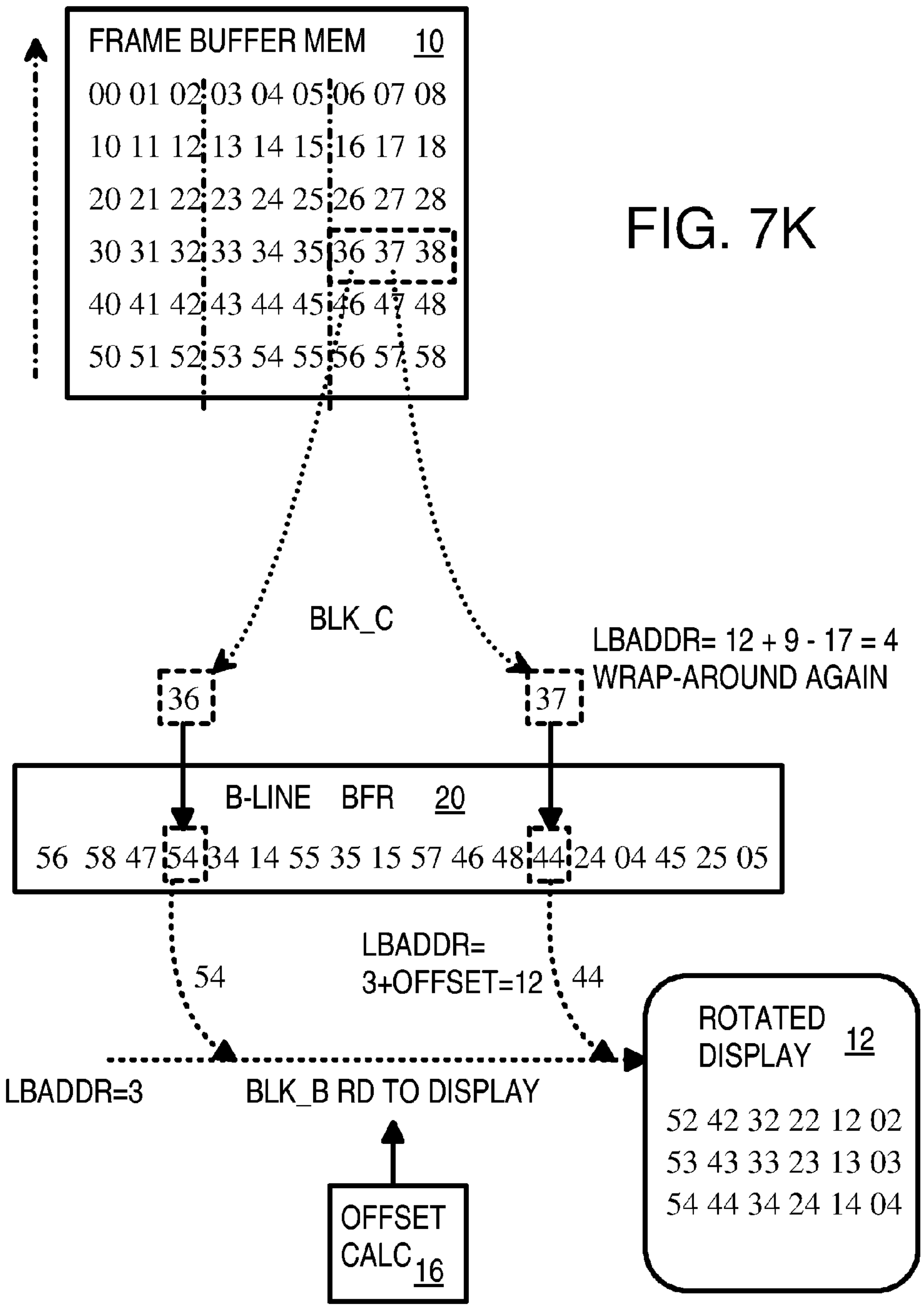
Figure 7L:
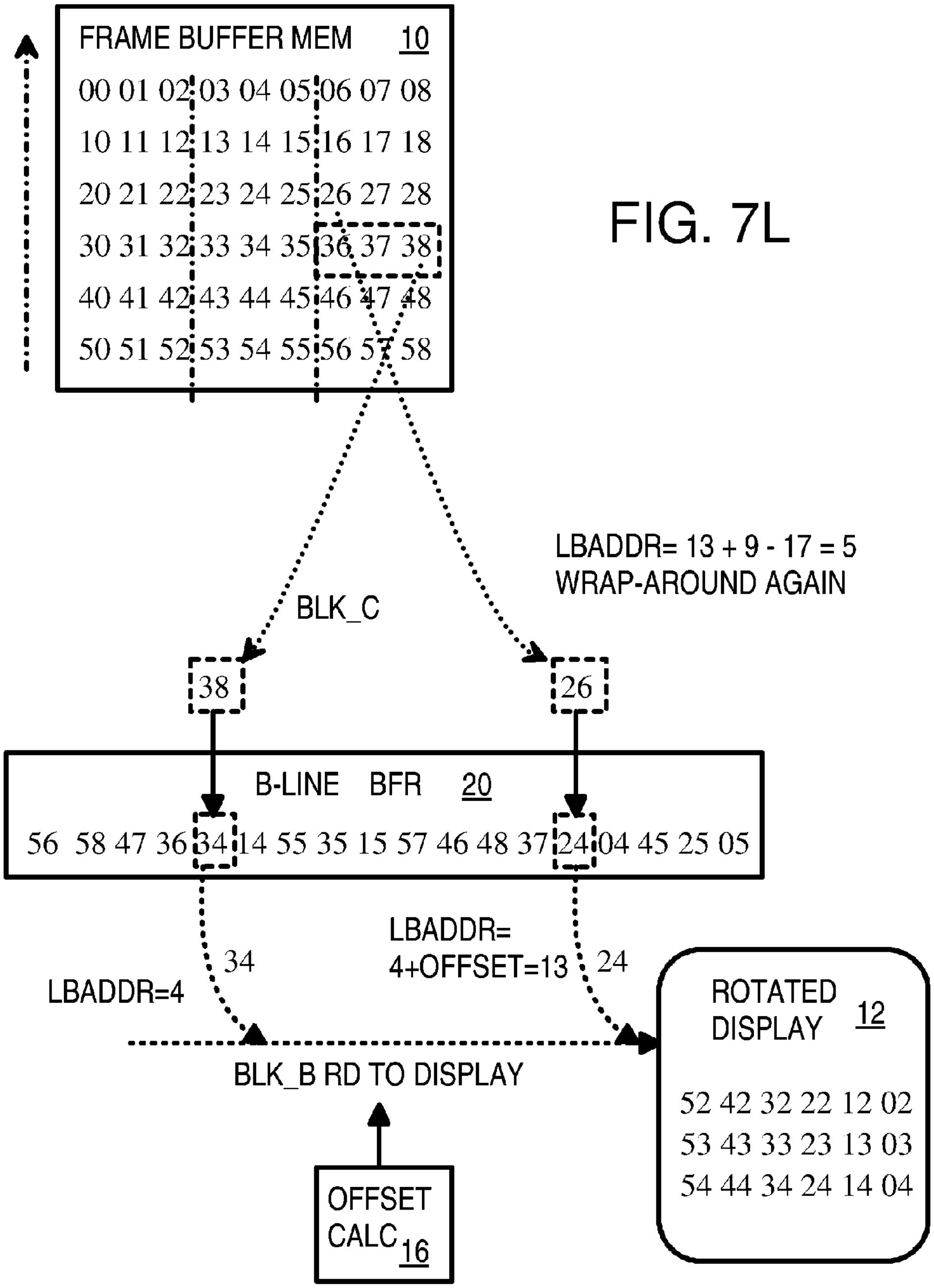
Figure 7M:
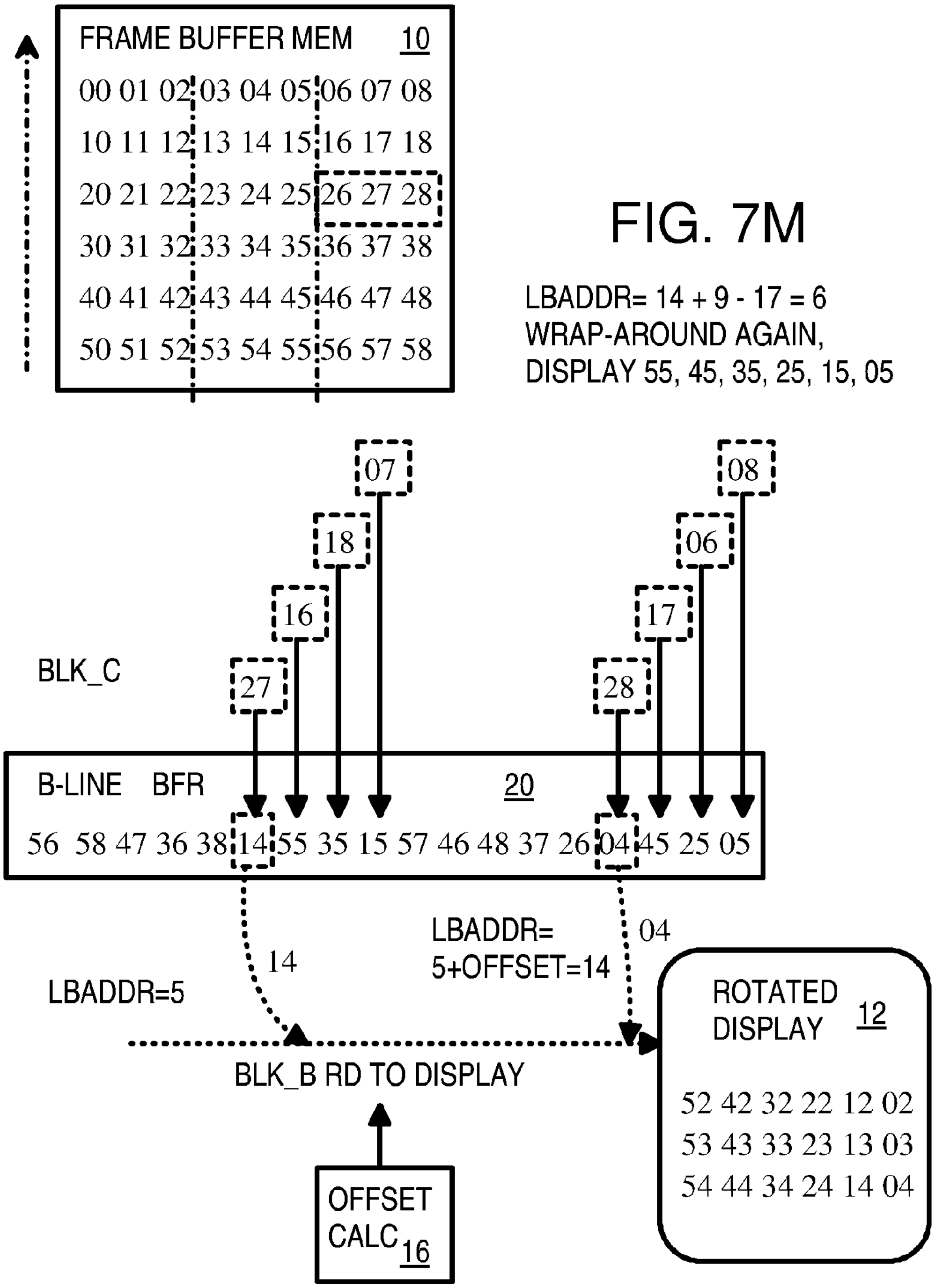
Figures 7N, 7O:
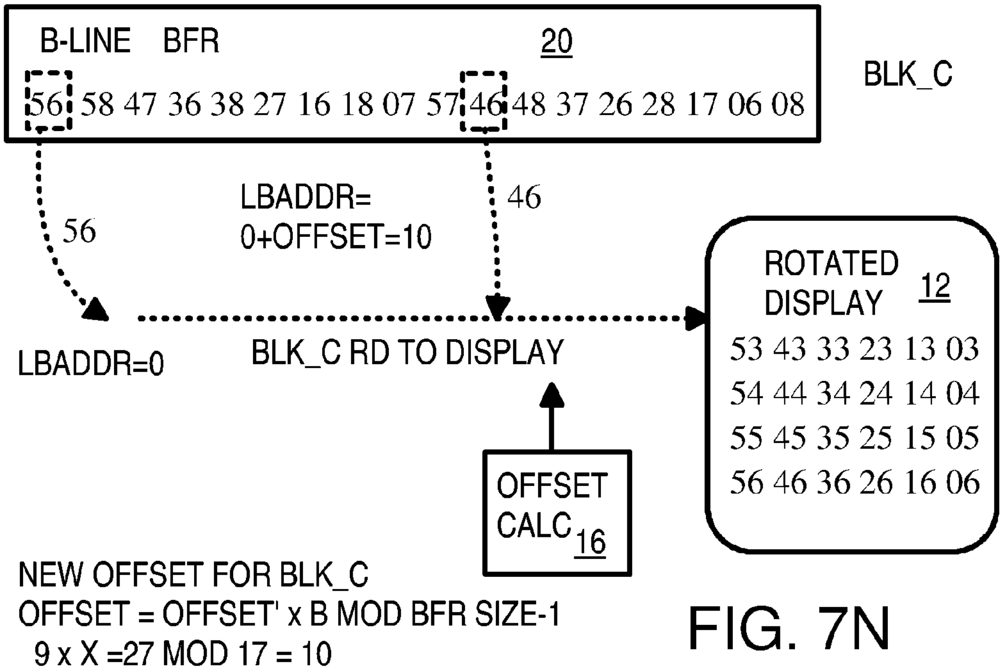

FIGS. 7A-O show an example of writing and reading the line buffer using increasing offsets to rotate pixels for display. An un-rotated image is contained in frame buffer 10. In this simplified example, frame buffer 10 contains 6 lines of pixels, with 9 pixels per line. Thus Y=6 and X=9. More complex examples could be created but are quite lengthy, but could include rotating a display of 80 lines of 40 pixels per line, or other display sizes.

The pixels in the top line of frame buffer 10 are labeled 00, 01, 02, 03, . . . 08. The second line of pixels is 10, 11, 12, 13, . . . 18, while the last (sixth) line is 50, 51, 52, 53, . . . 58. In the un-rotated display order, pixels are streamed to the display starting with 00, 01, 02, 03, . . . and continuing in row or line order until ending with last-line pixels 50, 51, 52, . . . 56, 57, 58.

The pixel may be read with a burst of 3 pixels, so B=3. Frame buffer 10 is divided into blocks that are B pixels wide, or blocks of 3 pixels per line with all 6 lines. The size of line buffer 20 is B*Y, or 18 pixels. The pixels are buffered and re-ordered through line buffer 20 and then displayed on rotated display 12 as X lines of Y pixels per line, or 9 lines of 6 pixels per line. The rotated display order has pixels 50, 40, 30, 20, 10, 00 in the top line, pixels 51, 41, 31, 21, 11, 01 in the second line, and pixels 58, 48, 38, 28, 18, 08 in the bottom line. The pixels are streamed to rotated display 12 from line buffer 20 in this rotated-display order by using an increasing-offset read order from line buffer 20.

Pixels are read from block A of frame buffer 10 using the burst bottom-up read order and sequentially written into line buffer 20 using an initial write offset of 1. The first burst reads pixels 50, 51, 52 of the bottom line and writes them to the first 3 locations in line buffer 20. The second burst reads pixels 40, 41, 42 which are written to the next 3 locations in line buffer 20. The last burst of pixels 00, 01, 02 from the top line of frame buffer 10 are written to the last 3 locations of line buffer 20. A total of 6 burst reads of frame buffer 10 completes reading of all 6 lines of block A, and fills line buffer 20.

In FIG. 7B, the first pixel 50 is read out of line buffer 20 at the first location in the line buffer. This pixel 50 is displayed in the upper left corner of rotated display 12. Pixel 53 from second block B of frame buffer 10 is read and written into this first location in line buffer 20.

The second pixel read out of line buffer 20 is located one offset away, at the fourth location. This pixel 40 is the second pixel displayed on rotated display 12. The opening left by display of pixel 40 is over-written by pixel 54 from second block B of frame buffer 10.

In FIG. 7C, A-block pixels 30 and 20 at locations spaced apart by the offset of B are read and displayed on the first line of rotated display 12. From block B of frame buffer 10, pixel 55 fills the 7th location that was vacated by A-block pixel 30, while B-block pixel 43 fills the 10th location that was vacated by A-block pixel 20.

In FIG. 7D, the other two pixels 44, 45 from the burst read of frame buffer 10 are written into vacancies produced when pixels 10 and 00 are displayed on rotated display 12. These vacant locations are spaced apart by B, at the 13th and 16th locations in the 18-location line buffer. These locations are at LBADDR=12 and LBADDR=15, where the 1st location in line buffer 20 is at LBADDR=0 and the last location is LBADDR=17.

In FIG. 7E, the index wraps around. The last position read was at LBADDR=15. Adding the offset of 3 produces 18, which is past the end of line buffer 20. Subtracting the reduced modulus of 17 from 18 yields LBADR=1, so the next pixel is read from the second position, pixel 51. This is the first pixel displayed on the second line of rotated display 12. The next pixel read from block B of frame buffer 10 is pixel 33, which is written into position LBADR=1.

In FIG. 7F, additional pixels in the second rotated line are read and displayed. Adding the offset B to the last position read, LBADDR=1, produces LBADDR=4 as the next position read from line buffer 20. Pixel 41 is read and displayed, while pixel 34 from block B is written into this position. After this, pixels 31, 21, 11, 10 are read from positions 7, 10, 13, 16 and displayed as the rest of the second rotated line on rotated display 12. These positions are replaced with pixels 35, 23, 24, 25 from block B, respectively.

Pixels could over-write the displayed pixels immediately. For example, pixel 34 could overwrite pixel 41 as soon as pixel 41 is read, even before it is displayed. Then as soon as pixel 31 is read, pixel 35 could be written in. Thus writing pixels into line buffer 20 could alternate with reading pixels for display. Alternately, the writing of pixels could be delayed somewhat. Pixels 21, 11, 01 could all be read and displayed before pixels 23, 24, are written in. Pixels 23, 24, 25 could be read from frame buffer 10 as a burst read and written into three empty locations in line buffer 20 if this burst read is delayed until after the reading of pixel 01, when all three of pixels 21, 11, 01 have been read and displayed. This slight delay of writing can be more efficient than immediately writing, since three pixels are read from frame buffer 10 at a time, instead of just one pixel. Another alternative is to read all three pixels in a burst, then store the 3 pixels until the vacancies in line buffer 20 are created.

In FIG. 7G, the third rotated line is read and displayed. Another index wrap-around occurs, from position LBADDR=16 to LBADDR=2. The third position, pixel 52 at LBADDR=2 is read and replaced with pixel 13. Alternately, pixels 52, 42, 32 at positions LBADDR=2, 5, 8 are read and displayed, then pixels 13, 14, 15 are read as a burst from frame buffer 10 and written into these vacant positions. Then pixels 22, 12, 02 are read from LBADDR=11, 14, 17 and over-written by pixels 03, 04, 05 from the first line in frame buffer 10.

At this point 3 rotated lines have been displayed on rotated display 12, and all of block A has been displayed. Further, all pixels in block B have been loaded into line buffer 20.

In FIG. 7H, the second block begins to be displayed as the offset is increased. The offset was B=3 for reading the first block A. Now offset calculator 16 increases the offset by a factor of B, to B*B or 9. The second block B pixels are read and the third block C pixels are written to the resulting vacancies, which are separated by the new offset of 9

The index pointer LBADDR is reset to 0, and the first pixel 53 is read from the first position in line buffer 20. The next pixel read is offset by 9, at LBADDR=0+9=9. This is pixel 43, the second pixel on the fourth rotated display line. Pixels 56, 57 from block C are read from frame buffer 10 and written to positions 0, 9.

Adding the new offset of 9 to the current position 9 produces 18, which over-runs line buffer 20. Subtracting the reduced modulus of 17 produces 1, so the next pixel 33 is read from position LBADDR=1. FIG. 7I shows this pixel 33 being read from position 1, while block-C pixel 58 over-writes it. Adding the offset of 9 produces LBADDR=10, so pixel 23 is read and pixel 46 is written to position 10.

Adding the offset of 9 to current position 10 produces 19, which wraps to position 2. In FIG. 7J, positions 2 and 11 are read and pixels 13, 03 displayed. Positions 2, 11 are over-written by pixels 47, 48 from the third block.

Adding offset 9 to 11 produces 20, which wraps to position 3. In FIG. 7K, positions 3 and 12 are read and pixels 54, 44 displayed. Positions 3, 12 are over-written by pixels 36, 37 from the third block.

Then adding offset 9 to 12 produces 21, which wraps to position 4. In FIG. 7L, positions 4 and 13 are read and pixels 34, 24 displayed. Positions 4, 13 are over-written by pixels 38, 26 from the third block.

Further adding offset 9 to 13 produces 22, which wraps to position 5. In FIG. 7M, positions 5 and 14 are read and pixels 14, 04 displayed to complete display of the rotated line. Positions 5, 14 are over-written by pixels 27, 28 from the third block.

Next, adding offset 9 to 14 produces 23, which wraps to position 6. Positions 6 and 15 are read and pixels 55, 45 displayed. Positions 6, 15 are over-written by pixels 16, 17 from the third block.

Again jumping by the offset from position 15 wraps to position 7. Positions 7 and 16 are read and pixels 35, 25 displayed. Positions 7, 16 are over-written by pixels 18, 06 from the third block. Then position 16 wraps to position 8. Positions 8 and 17 are read and pixels 15, 05 displayed. Positions 8, 17 are over-written by pixels 07, 08, the last pixels from the third block.

In FIG. 7N, all of block B has been displayed, and block C is stored in line buffer 20. The new offset for block C is the old offset of 9, multiplied by the burst number (B=3). The product is 27. In modulo 17, 27 is 10. Thus the new offset calculated by offset calculator 16 is 10.

The index pointer is reset to zero for reading the new block, so the first position read is LBADDR=1, which has pixel 56. Since this is the last block, no writing into line buffer 20 is needed. The next pixel read is an offset of 10 away, pixel 46 at position 10. Adding the offset of 10 to position 10 produces 20, which wraps to position 3. Pixel 36 is located at position 3. Pixel 26 is read next at position 13.

Adding the offset of 10 to position 13 produces 23, which wraps to position 6. Pixel 16 is located at position 6. Pixel 06 is read next at position 16. The last rotated line displayed is 56, 46, 36, 26, 16, 06. The table at FIG. 7O shows these pixels and their locations.

MORE COMPLEX EXAMPLES

More complex examples may be created using the equations described herein. These more realistic examples quickly become quite lengthy. For example, rotating a display of 80 lines of 40 pixels per line, with a burst-size of 8 pixels, uses a line buffer of 80×8=640 pixels, since X=40, Y=80, and B=8. There are 40/8=5 blocks.

Initially the first block K=0 is written in sequentially. Then the offset is set to B=8, and pixels are read out at locations 0, 8, 16, 24, 32, 40, 48, 56, . . . and continues reading at locations (N*B)mod(B*Y−1), until the block's last pixel is reached at N=B*Y−1. The second block's pixels are written into these read locations sometime after reading of a pixel creating a vacancy occurs, but before the pixel being written in needs to be displayed.

After the first block is read for display and the second block's pixels have filled line buffer 20, offset calculator 16 generates the new offset by multiplying the old offset by B. The new offset is 8*8 or 64. The second block's pixels are read at locations 0, 64, 128, 192, 256, 320, 384, 448, 512, 576, then the index wraps to 640−639=1, and continues reading from locations 1, 65, 129, 193, 257, 321, 385, 449, 513, 577, then wraps around using the reduced modulus of 639 to location 2, and continues reading pixels from locations 2, 66, 130, etc. Reading the second block's pixels and writing the third block's pixels continues at locations (N*64) mod(639), until the second block's last pixel is reached at N=639. The second block is then finished reading and the third block has finished writing into line buffer 20.

The next offset is the old offset of 64, multiplied by B, or 64×8=512. The third block's pixels are read at locations 0, 512, then 1024−639=385, then 385+512−639=258, then 258+512−639=131, and continuing at locations (N*512) mod(639) until all pixels in the third block have been read and all pixels in the fourth block have been written.

The next offset is (512*8)mod(639) or (4096)mod(639), which is 262. The fourth block's pixel's are read from and the fifth block's pixels are written in to locations 0, 262, 524, 147, 409, 32, 294, . . . (N*262)mod(639).

The next block to read is the fifth block, K=4. The new offset is (262*8)mod(639) or (2096)mod(639), which is 179. Alternately, the new offset can be calculated as B**(K+1) modulo(B*Y−1), or (85)modulo(639), or 32768 mod 639, which is also 179. The fifth block's pixel's are read from locations 0, 179, 358, 537, 77, 256, 435, 614, 154** . . . (N*179)mod(639).

Equations for 90-Degree Display Rotation

Other even more complex examples could be generated for rotating a display of Y lines of X pixels, with a burst of B, using the equations:

Offset F for reading block K and for writing block K+1 is:

$$F=B^{**}(K+1)\text{modulo}(B^*Y-1)$$

Read block K's pixels and write block K+1 pixels to locations:

(N*F)mod(B*Y−1), for N=0 to B*Y−1.

The line buffer has B*Y locations 0, 1, 2, . . . B*Y−1.

The un-rotated frame buffer is divided into X/B blocks K=0, 1, 2, . . . each block having Y lines of B pixels per line.

The rotated display has X lines of Y pixels per rotated line.

For 270 degree rotation, the 90 degree equations may be used, but with different memory fetching. Instead of fetching from bottom left, it fetches from the top right. Writing into the line buffer is also reversed within the burst order of a burst write.

ALTERNATE EMBODIMENTS

Several other embodiments are contemplated by the inventors. For example pixels can have various widths expressed in bit, bytes, or some other amount, depending on color density, resolution, modes, encoding, and other factors. Additional non-displaying pixels may be read and not displayed, and various overlay, icon, cursor, and other operations may be performed.

When the rotated display's dimensions do not exactly match the frame buffer, some pixels may be dropped, or only a subset of the frame buffer may be read and displayed on the rotated display. Pixels could also be duplicated or dummy pixels could be displayed to fill in gaps. Pixels could be processed before display, such as by a color-remapping table or texture processing. Read and write can be in the same clock domains or in different clock domains.

Various pipelining could also be incorporated and the timings adjusted. Temporary buffering and pipeline delay registers could be added, such as within the display. For example, the pixel could be read from line buffer 20 and written into a register on the rotated display 12 before actually being used to light up a visible pixel. The vacancy in line buffer 20 could be over-written before the pixel is actually visibly displayed. Two line buffers 20 could be used in parallel or with interleaving.

The initial writing of the first block's pixels into line buffer 20 could occur during the vertical blanking or back-door porch time. The method could also be used for general image processing or even database table rotation rather than just before display of pixels.

The image displayed may be rotated in either direction: by 90 degrees or −90 degrees (270 degrees). The physical display itself may or may not be physically turned by the user. Some images may be rotated and displayed in rotated mode, but the user keeps viewing the display in the same orientation. For 270 degree rotation, frame buffer 10 may be read in an inverse of the burst bottom-up order, which reads from the top line to the bottom line.

Rather than calculate the next offset computationally, the next offset could be generated by latching the LBADDR of the Bth read/write. This is equivalent to multiplying the old offset by the burst size B since read/write locations are spaced apart by the old offset and wrap around the end of the line buffer using the reduced modulus.

Various transformations, inversions, etc may be performed. For example, rather than starting a block by writing to LBADDR=0, another starting address may be chosen.

Various combinations of hardware logic, programmable logic, software, firmware, or functional units may be used to generate and store addresses and offsets. The line buffer could be part of a larger memory or could have additional locations that are not used, depending on the current display mode. For example, line buffer 20 could have 1024 locations, but only the first B*Y locations are used, and Y changes with the display mode and B changes as the pixel size changes, such as for modes with higher color depths.

The frame buffer may be stored in a memory that does not physically have exactly Y rows and X columns. Some lines may have pixels spread across two or more physical rows in memory. This may cause some burst reads that cross a row but are within a line to be broken into two memory accesses.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means".

The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A pixel rotator comprising:

a frame-buffer burst-reader that reads a frame buffer of pixels arranged in a display-scan order for display as a non-rotated image, the display-scan order having an image region of Y lines of X pixels per line that is logically divided into X/B blocks of Y lines and B pixels per line, wherein B is a number of pixels that are read together in a burst read of the frame buffer, the B pixels being adjacent pixels in a same line of the frame buffer;

wherein X, Y, and B are whole numbers and B is at least 2;

a line buffer that is written by the frame-buffer burst-reader and stores B*Y pixels;

an offset generator that generates an offset for use by a block being read from the line buffer, the offset being increased by a factor of B within a modulus of B*Y−1 for each block read from the line buffer; and a pixel reader that reads pixels from the line buffer and send the pixels to a display for displaying the image region rotated as a rotated image of X lines of Y pixels per rotated line;

wherein the pixel reader reads a rotated-display-order series of pixels that are offset from adjacent pixels by the offset, and that wrap around the line buffer using the modulus of B*Y−1, the pixel reader sending the rotated-display-order series of pixels to the display for displaying as the rotated image;

wherein the frame-buffer burst-reader writes pixels in a next block to locations within the line buffer that the pixel reader read for displaying a current block, wherein locations written are offset from locations written by adjacent pixels in the next block by the offset, whereby pixels from the image region of the frame buffer in the display-scan order are re-ordered into the rotated-display-order series of pixels through writing and reading of the line buffer.

2. The pixel rotator of claim 1 wherein the offset generator generates the offset for reading a block K and for writing a next block K+1, wherein K is a whole number and is 0 for a first block, the offset F being B**(K+1)modulo(B*Y−1).

3. The pixel rotator of claim 2 wherein the frame-buffer burst-reader writes a pixel to the line buffer immediately after one vacancy is created by the pixel reader having read a pixel from block K;

whereby writing to the line buffer is not delayed.

4. The pixel rotator of claim 2 wherein the frame-buffer burst-reader reads a burst of B pixels from a block K+1 and writes the B pixels to the line buffer immediately after B vacancies are created by the pixel reader having read B pixels from block K;

whereby writing to the line buffer is delayed until a full burst of B pixels can be written.

5. The pixel rotator of claim 2 wherein the line buffer has B*Y locations identified by buffer addresses 0, 1, 2, . . . B*Y−1;

wherein the pixel reader reads pixels from the line buffer in a current block in an order defined by the rotated-display-order series of pixels, reading from locations in the line buffer having buffer addresses (N*F)mod (B*Y−1), for a series of pixels of index N being a whole number incremented from 0 to B*Y−1 for the current block, wherein F is the offset, which is a whole number between 1 and B*Y−1.

6. The pixel rotator of claim 5 wherein the frame-buffer burst-reader reads pixels from the frame buffer in a burst bottom-up order that is not the display-scan order, the burst bottom-up order being a sequence of pixels ordered so that:

pixels closer to a beginning of a current line are ordered before pixels later in the current line;

pixels from lines near a bottom of the frame buffer are ordered before pixels from lines closer to a top of the frame buffer, whereby pixels are read from the frame buffer in the burst bottom-up order and not in the display-scan order.

7. The pixel rotator of claim 6 wherein the image region of Y lines of X pixels per line is rotated by 90 degrees to form the rotated image of X lines of Y pixels per rotated line.

8. The pixel rotator of claim 7 wherein X is at least 40 pixels and Y is at least 80 lines for the image region being rotated.

9. The pixel rotator of claim 2 wherein B is at least 3 pixels.

10. A method for rotating pixels comprising:

reading pixels from a frame buffer, the frame buffer having the pixels arranged as Y lines of X pixels per line, wherein burst accesses of B pixel can occur within a line, wherein X, Y, and B are whole numbers of at least 3;

wherein the frame buffer is logically divided into blocks of Y lines of B pixels per line, the blocks being identified by K which is a whole number incremented from 0;

reading blocks from the frame buffer as a burst of B pixels per line;

reading a first block from the frame buffer and loading the first block into a line buffer in a sequential order;

reading the first block from the line buffer in a first jumping order of buffer addresses, wherein a jump between adjacent pixels sent in an output series to a rotated display are offset from each other by a first offset, the first offset being B;

wrapping addresses using a reduced modulus when a buffer address in the first jumping order exceeds a number of locations in the line buffer, the buffer address being reduced by the reduced modulus of less than the number of locations in the line buffer;

sending the output series to the rotated display for display as X lines of Y pixels per rotated line;

reading a second block from the frame buffer and loading the second block into the line buffer in the first jumping order of buffer addresses;

reading the second block from the line buffer in a second jumping order of buffer addresses, wherein a jump between adjacent pixels sent in an output series to a rotated display are offset from each other by a second offset, the second offset being B*B;

wrapping addresses using the reduced modulus when a buffer address in the second jumping order exceeds the number of locations in the line buffer, the buffer address being reduced by the reduced modulus;

reading a third block from the frame buffer and loading the third block into the line buffer in the second jumping order of buffer addresses;

reading the third block from the line buffer in a third jumping order of buffer addresses, wherein a jump between adjacent pixels sent in an output series to a rotated display are offset from each other by a third offset, the third offset being B*B*B in the reduced modulus; and wrapping addresses using the reduced modulus when a buffer address in the third jumping order exceeds the number of locations in the line buffer, the buffer address being reduced by the reduced modulus, whereby pixels are re-ordered by reading blocks from the frame buffer and loading the blocks into the line buffer and reading the pixels from the line buffer line buffer using offsets that increase by a factor of B for sequential blocks.

11. The method of claim 10 wherein loading the second block into the line buffer in the first jumping order of buffer addresses occurs simultaneously with reading the first block from the frame buffer in the first jumping order of buffer addresses;

wherein loading the third block into the line buffer in the second jumping order of buffer addresses occurs simultaneously with reading the second block from the frame buffer in the second jumping order of buffer addresses, whereby the line buffer is loaded with a new block as pixels are read out from a prior block.

12. The method of claim 11 wherein the reduced modulus is one less than a number of locations in the line buffer.

13. The method of claim 12 wherein reading the first, second, and third blocks from the frame buffer each comprise reading pixels from a bottom line to a top line in the frame buffer.

14. The method of claim 13 further comprising:

displaying the pixels to a user on a rotated display device that receives pixels in the output series, wherein the pixels in the output series are displayed as X lines of Y pixels per rotated line, wherein each pixel controls color and intensity of a point of light on the rotated display device.

15. The method of claim 14 further comprising for additional blocks K:

reading a block K from the frame buffer and loading the block K into the line buffer in a K−1 jumping order of buffer addresses;

wherein a jump between adjacent pixels in the K−1 jumping order are offset from each other by a K−1 offset, the K−1 offset being B**(K) in the reduced modulus;

reading the block K from the line buffer in a K jumping order of buffer addresses, wherein a jump between adjacent pixels sent in the output series to the rotated display are offset from each other by a K offset, the K offset being B**(K+1) in the reduced modulus; and wrapping addresses using the reduced modulus when a buffer address in the K jumping order exceeds the number of locations in the line buffer, the buffer address being reduced by the reduced modulus.

16. A rotating-image display system comprising:

frame buffer means for storing pixels in an un-rotated order of Y lines of X pixels per line, wherein X and Y are whole numbers of at least 40;

burst-read means, coupled to the frame buffer means, for reading pixels from the frame buffer means in a burst access of B pixels per burst read that are within a same line of the Y lines, wherein B is a whole number of at least 3;

wherein the burst-read means sequentially reads block of pixels, wherein each block has Y lines of B pixels per line, wherein the burst-read means reads all pixels in a current block before reading pixels in a next block;

line buffer means for storing B*Y pixels for re-ordering, wherein pixels stored in the line buffer means are accessed by buffer addresses;

rotated display means for displaying X lines of Y pixels per line that represent a rotated image of the pixels stored in the frame buffer means, the rotated display means receiving and displaying pixels in an output order that is rotated by 90 degrees from the un-rotated order;

offset calculator means for generating offsets, wherein a next offset for the next block is an offset for the current block multiplied by B in a reduced modulus that is less than B*Y;

address generator means for generating buffer addresses to the line buffer means, wherein the buffer addresses for reading the current block are increased by the next offset for the next block and are wrapped around the line buffer means by subtracting the reduced modulus when the buffer address overruns the line buffer means;

initial write means for reading pixels in a first block from the frame buffer means and sequentially writing the pixels into the line buffer means;

buffer read means for reading pixels from the line buffer means in the output order and sending the pixels in the output order to the rotated display means in response to buffer addresses from the address generator means; and block write means for writing pixels from the next block from the frame buffer means into the line buffer means, wherein the block write means writes pixels to vacancies in the line buffer means that are created by the buffer read means as pixels are read in the output order;

wherein pixels from a current block are read by buffer addresses generated using the next offset for the next block, but are written by buffer addresses generated using the offset for the current block.

17. The rotating-image display system of claim 16 wherein the burst-read means includes bottom-up read means for reading a block by first reading a burst of B pixels in a last line, then reading a burst of B pixels in a penultimate line, then reading bursts of B pixels in sequentially prior lines until lastly reading a burst of B pixels in a top line in the frame buffer means, whereby blocks are read from the frame buffer means in bottom-up order.

18. The rotating-image display system of claim 16 wherein the burst-read means includes top-down read means for reading a block by first reading a burst of B pixels in a first line, then reading a burst of B pixels in a second line, then reading bursts of B pixels in sequentially following lines until lastly reading a burst of B pixels in a bottom line in the frame buffer means, whereby blocks are read from the frame buffer means in top-down order for 270-degree rotation mode.

19. The rotating-image display system of claim 16 wherein the offset calculator means generates the next offset for a next block K+1 as B**(K+1)modulo(B*Y−1);

wherein K is a block number from 0 to (X/B)−1;

wherein the frame buffer means contains X/B blocks for rotation.

20. The rotating-image display system of claim 16 wherein the buffer addresses are whole numbers from 0 to B*Y−1; and wherein the reduced modulus is B*Y−1.

21. The rotating-image display system of claim 16 wherein the address generator means generates a sequence of the buffer addresses as (N*B)mod(B*Y−1), wherein N is an integer incremented for each buffer index in the sequence from 0 to B*Y−1.

* * * * *